(12) United States Patent
Sobel et al.

(10) Patent No.: US 8,845,424 B2
(45) Date of Patent: *Sep. 30, 2014

(54) HAND-HELD GAMING DEVICE WITH CONFIGURABLE TOUCH SENSITIVE PANEL(S)

(71) Applicant: Broadcom Corporation, Irvine, CA (US)

(72) Inventors: David A. Sobel, Los Altos, CA (US); Monika Gupta, Irvine, CA (US); Sumant Ranganathan, Saratoga, CA (US); Pieter Vorenkamp, Laguna Niguel, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,316

(22) Filed: Apr. 22, 2013

(65) Prior Publication Data
US 2013/0237322 A1    Sep. 12, 2013

Related U.S. Application Data

(63) Continuation of application No. 12/912,645, filed on Oct. 26, 2010, now Pat. No. 8,449,393.

(60) Provisional application No. 61/261,702, filed on Nov. 16, 2009.

(51) Int. Cl.
*G06F 17/00* (2006.01)
*G06F 7/04* (2006.01)
*G06F 3/033* (2013.01)
*G06F 21/32* (2013.01)

(52) U.S. Cl.
CPC ............... *G06F 3/033* (2013.01); *G06F 21/32* (2013.01)
USPC ............................... 463/29; 340/5.82; 463/37

(58) Field of Classification Search
USPC ................................. 345/156, 168; 463/29, 37
See application file for complete search history.

(56) References Cited

U.S. PATENT DOCUMENTS

| | | | | |
|---|---|---|---|---|
| 5,896,125 | A  * | 4/1999 | Niedzwiecki | 345/168 |
| 2007/0060391 | A1 * | 3/2007 | Ikeda et al. | 463/46 |
| 2008/0004113 | A1 * | 1/2008 | Avery et al. | 463/37 |
| 2010/0194677 | A1 * | 8/2010 | Fiebrink et al. | 345/156 |
| 2010/0234074 | A1 * | 9/2010 | Keski-Jaskari | 455/566 |
| 2010/0248822 | A1 * | 9/2010 | Migos et al. | 463/29 |
| 2011/0028194 | A1 * | 2/2011 | Tang et al. | 463/1 |

* cited by examiner

*Primary Examiner* — Dmitry Suhol
*Assistant Examiner* — Jason Yen
(74) *Attorney, Agent, or Firm* — Garlick & Markison; Kevin L. Smith

(57) ABSTRACT

A game controller with a communications interface includes a touch sensitive pad having a plurality of touch sensitive elements, and processing circuitry coupled to the communications interface and the at least one touch sensitive pad. The processing circuitry enacts touch pad configuration settings that correlate subsets of the plurality of touch sensitive elements to produce distinct user input locations. The processing circuitry receives touch pad input from the at least one touch sensitive pad. The processing circuitry processes the touch pad input to determine user input directions based upon the touch pad configuration settings, and then transmits the touch pad input directions via the communications interface for use as gaming input.

20 Claims, 16 Drawing Sheets

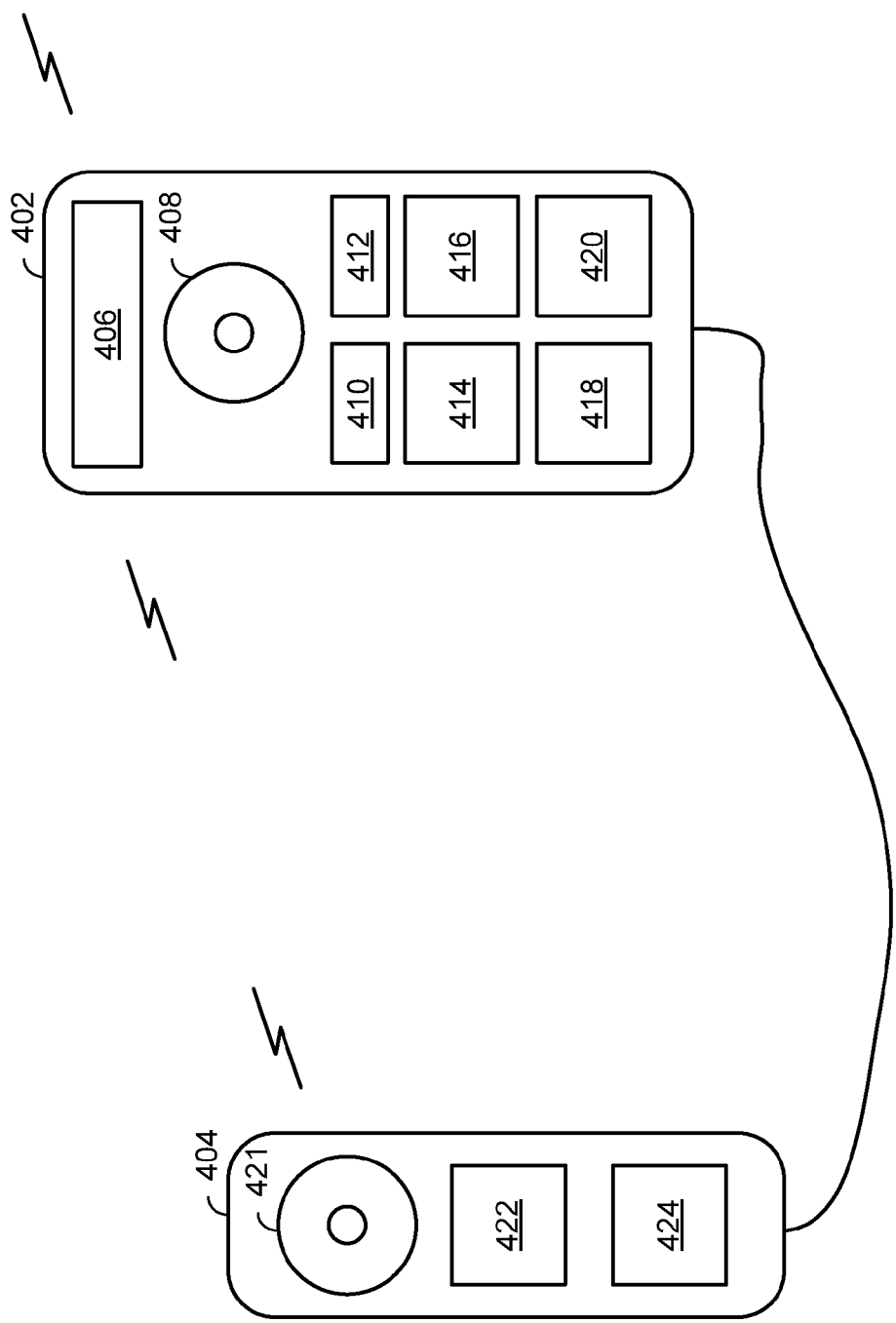

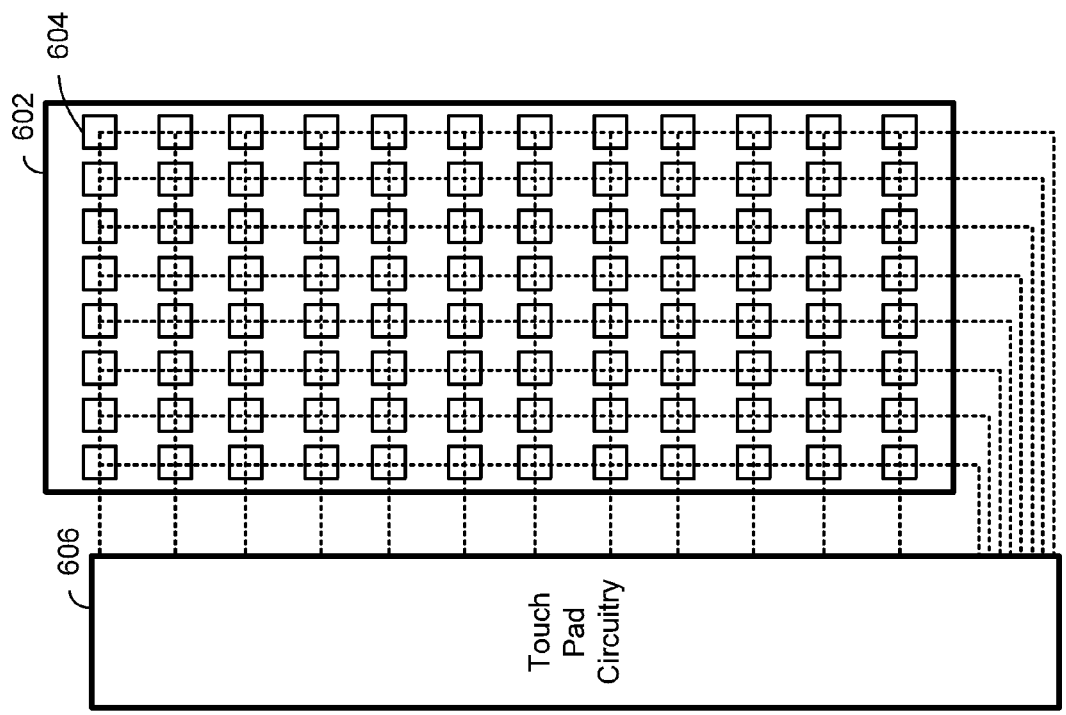

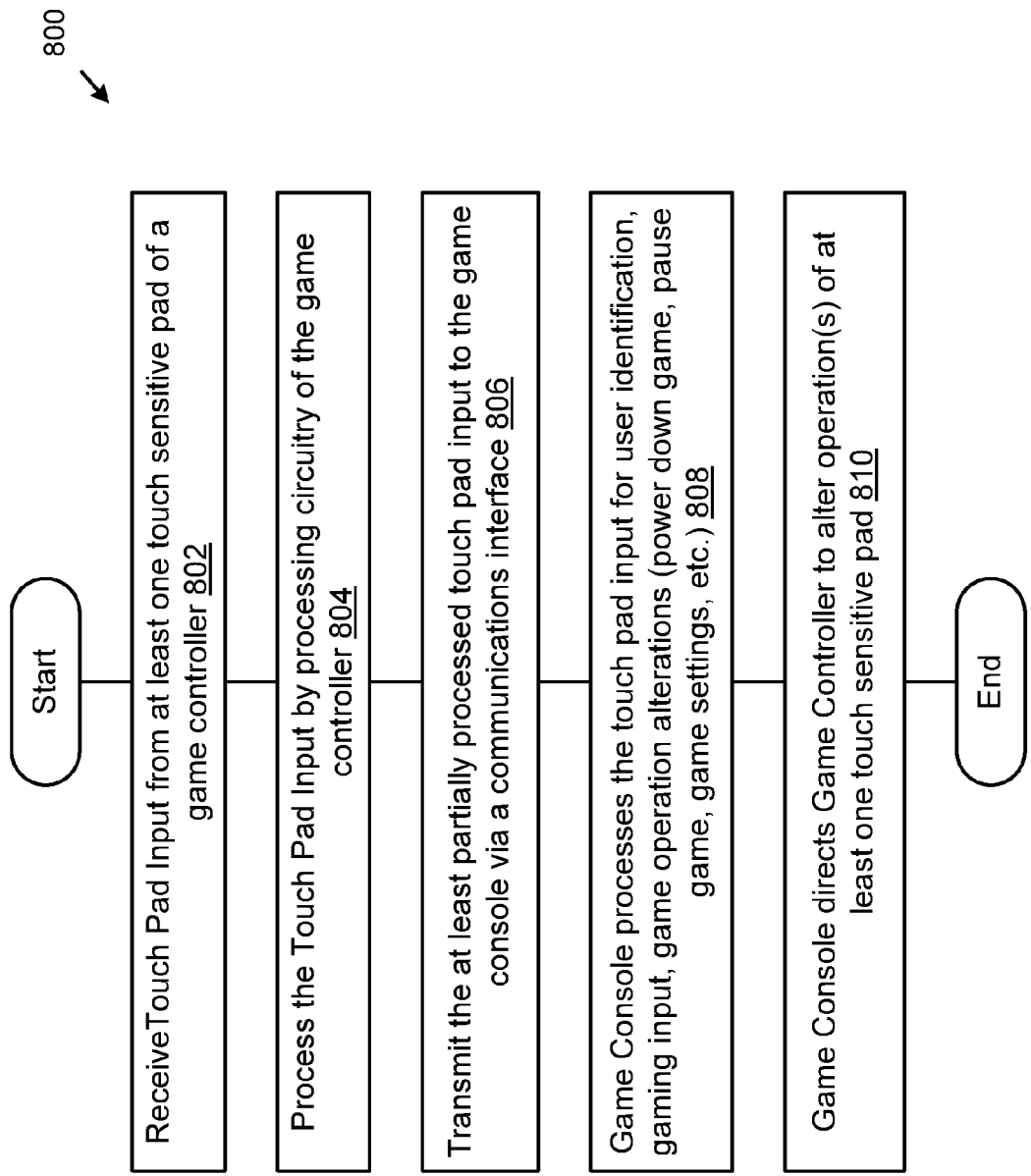

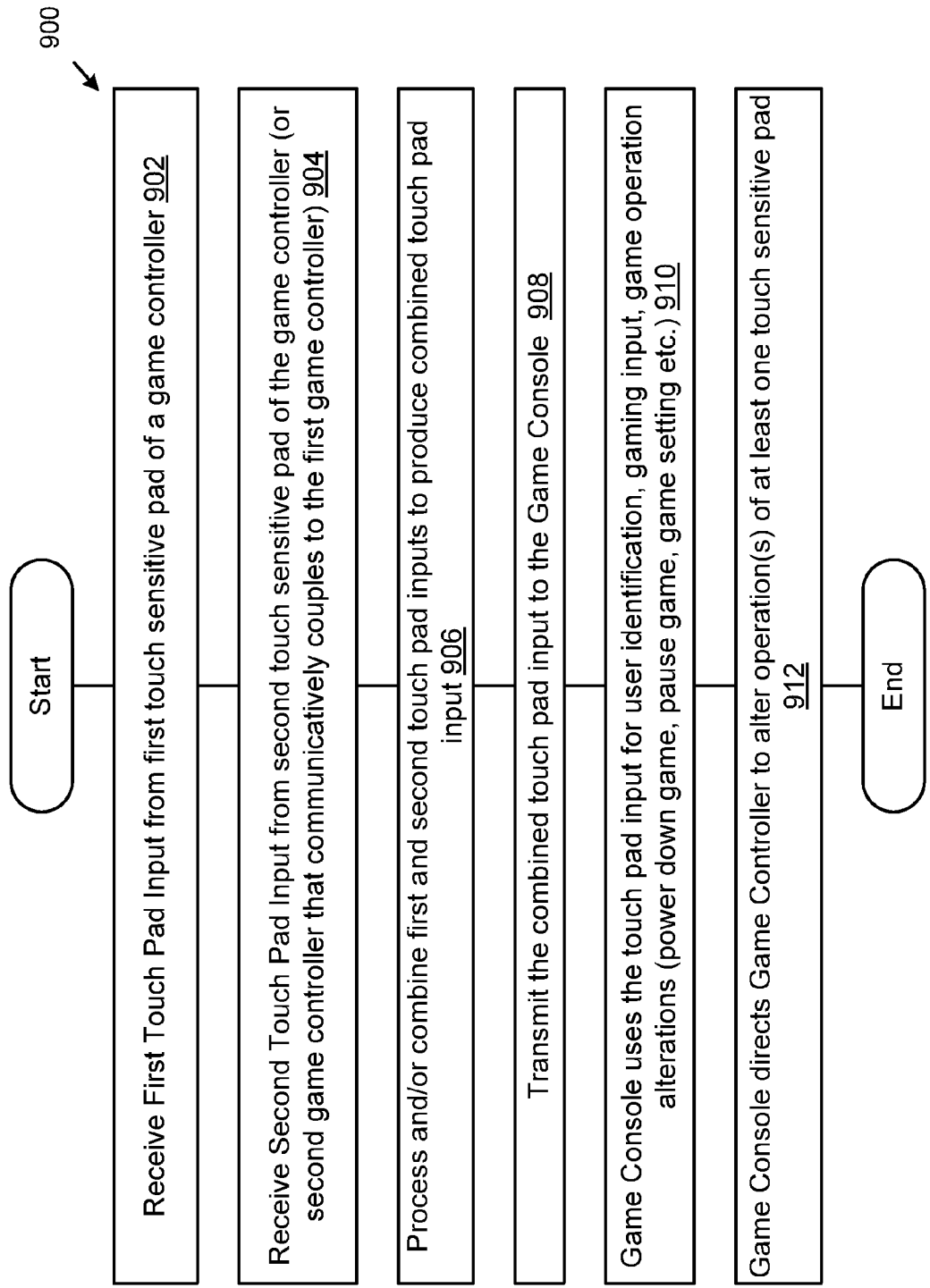

HAND-HELD GAMING DEVICE WITH CONFIGURABLE TOUCH SENSITIVE PANEL(S)

CROSS-REFERENCE TO RELATED APPLICATIONS

The present U.S. Utility patent application claims priority pursuant to 35 U.S.C. §120, as a continuation, to the following U.S. Utility patent application, which is hereby incorporated herein by reference in its entirety and made part of the present U.S. Utility patent application for all purposes:

1. U.S. Utility application Ser. No. 12/912,645, entitled "HAND-HELD GAMING DEVICE WITH CONFIGURABLE TOUCH SENSITIVE PANEL(S)," filed Oct. 26, 2010, issued as U.S. Pat. No. 8,449,393, on May 28, 2013, which claims priority pursuant to 35 U.S.C. §119(e) to the following U.S. Provisional patent application, which is hereby incorporated herein by reference in its entirety and made part of the present U.S. Utility patent application for all purposes:

a. U.S. Provisional Application Ser. No. 61/261,702, entitled "TOUCH PAD USER IDENTIFICATION, GAMING INPUT, AND PREFERENCE INPUT," filed Nov. 16, 2009.

BACKGROUND

1. Field of the Technology

The present invention relates generally to electronic gaming devices; and more particularly to touch pad operations with such electronic gaming devices.

2. Description of the Related Art

User gaming devices are fairly well known. These devices include game consoles with communicatively couple controllers such as Nintendo game consoles, Sony game consoles, Microsoft game consoles, and various other game console devices. These game consoles couple to a television, may couple to an audio system, and support user game playing. Some of these game consoles support wireless communications with handheld game controllers and/or other game controllers. For example, the Nintendo Wii includes handheld controllers that detect their orientation to some degree, acceleration to some degree, and receive standard button inputs from a user. This information is wirelessly relayed to the game controller to control operation of corresponding game elements within the gaming environment. Other game controllers may include simulated game devices such as musical instruments, baseball bats, golf clubs, and various other types of simulated devices.

With the continued advancement of technology, the complexities and capabilities of game consoles have become advanced. The game controllers support sophisticated gaming inputs received via numerous input sources, e.g., buttons, accelerometers, IR orientation detectors, positional detectors, and various other gaming inputs. The gaming environment in which these gaming inputs are received is very complex, providing a fairly realistic experience for a user of the gaming device/console. While some games supported by a game console may support only a few gaming inputs, other games require a large number of gaming inputs.

Most game consoles support many differing games, which are software controlled via respective software programming. Sometimes game controllers are specific to the particular game being supported, e.g., guitar hero, rock star, and various other particular types of games. In such case, these various types of inputs must be supported by differing unique game controllers. The expense and complexity of the multiple game controllers can be overwhelming for some users from a cost standpoint.

Many gaming systems are contained within one unit such as the Nintendo Game Boy and its successors and the Sony Play Station and its successors, for example. These gaming systems include processing resources and a user interface contained within a single unit. With these units, various buttons receive user input while a display and speakers provide user output. Because of the limited battery life available for these units, their functionality has been limited in some regard.

BRIEF DESCRIPTION OF THE DRAWINGS

FIG. 4 is a block diagram illustrating a game controller and coupled secondary game controller, both of which are constructed according to one or more embodiments of the present invention;

FIG. 6 is a block diagram illustrating a touch sensitive pad and touch pad circuitry constructed according to one or more embodiments of the present invention;

FIG. 8 is a flowchart illustrating operations of a game controller and a game console to receive and process touch pad input according to one or more embodiments of the present invention;

FIG. 9 is a flowchart illustrating other operations of a game controller and a game console to receive and process touch pad input according to one or more embodiments of the present invention;

DETAILED DESCRIPTION OF THE DRAWINGS

Figure 1:
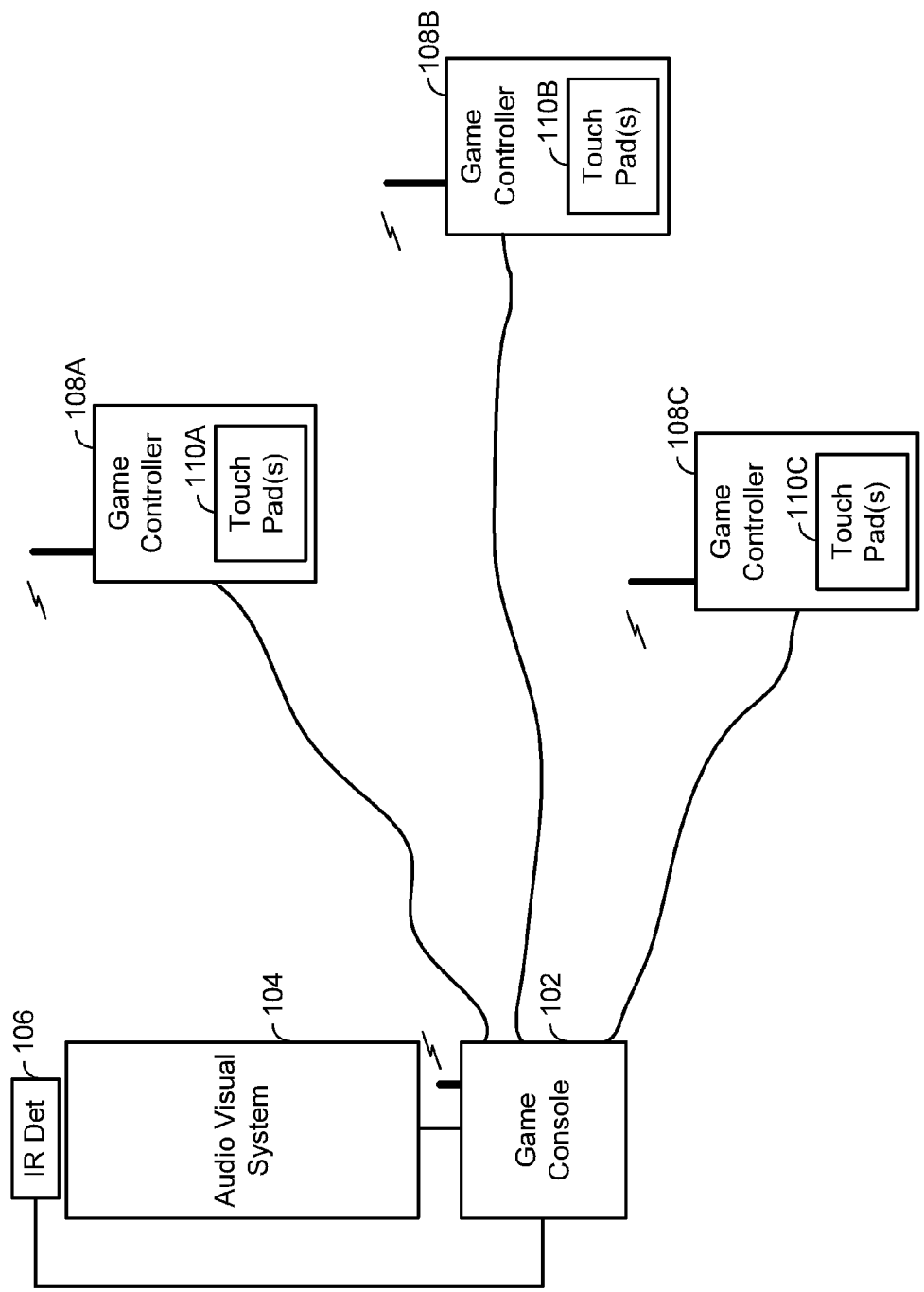
FIG. 1 is a system diagram illustrating a video game system constructed according to one or more embodiments of the present invention.

FIG. 1 is a system diagram illustrating a video game system constructed according to one or more embodiments of the present invention. The video game system 100 of FIG. 1 includes a game console 102 and a plurality of game controllers 108A, 108B, and 108C. The game console 102 couples to an audio/visual system 104 that includes a video monitor and an audio system. The game console 102 also couples to an infrared (IR) detector 106.

The game controllers 108A, 108B, and 108C communicate with the game console 102 via one or more of a wired and/or wireless communication link. The wired communication link may be a tethered controller including conductors that support wired communications. Wireless communications may be in various RF frequency bands and/or in the infrared range. Thus, each of the game controllers 108A, 108B, and 108C includes communication circuitry that allow the game controllers 108A, 108B, and 108C to communicate with the game console 102.

According to one or more embodiments of the present invention, each of game controllers 108A, 108B, and 108C includes one or more touch pads 110A, 110B, and 110C, respectively. According to some aspect of the present invention, the touch pads of the game controllers are used to identify users of the game controllers, to provide gaming input, to determine whether a user is active, and/or to provide other information to the game console 102 for subsequent action. Based upon one or more embodiments of the present invention, touch pads are coupled to touch pad circuitry that captures capacitance (inductance or RF propagation) characteristics of a plurality of elements of the touch pads. Based upon the capacitive (inductive/RF) information gathered from the touch pads, a user may be identified by game console 102 and/or a game controller 108A, 108B, or 108C.

According to one aspect of the present invention as will be further described with reference to the FIGs., the touch pad of a particular game controller includes a plurality of touch pad elements, each of which measures a characteristic at the particular touch pad element/touch pad location, i.e., capacitance, inductance, RF propagation characteristics, a combination of these, etc. In various embodiments, capacitance, inductance, RF propagation characteristics, and/or other local characteristics at a touch pad location are measured over time. Based upon particular touch pad location characteristics as measured over time, the game controller and/or game console may identify the particular user of the game controller. The user identity may then be used to set the characteristics of the particular game being operated or supported by the game console. Alternatively, the input received via the touch pads 110A, 110B, and/or 110C may be used for gaming input to the game console to modify operations of the game currently being supported by a game console to modify operation of the game currently being supported by a game console.

According to another operation of the present invention, the input received via the touch pad 110A, 110B, and/or 110C may be used to replace button functionality. In such case, the controllers may have a back lit touch pad display that provides representations of replaced buttons, each of which corresponds to one or more touch sensitive locations. Further, the plurality of touch sensitive elements of the touch pad 110A, 110B, and/or 110C may be configured to correlate to particular user input functions. Such configurations may change over time based upon a game being played, a currently active game portion, user preferences, and/or other reasons for altering functionality of the button replacement operations of the touch pads. According to various other operations of the present invention, the touch pads are calibrated so as to provide accurate input and/or altered in their operation to the right improved input.

The inventive concepts described herein may also be applied to/embodied by a single package video game, i.e., a video game system that is contained in a single housing. In such embodiments, the video game system includes a display, a user input, which includes one or more touch pads, processing components, memory components, and powering components, such as a battery and power circuitry.

Figure 2:
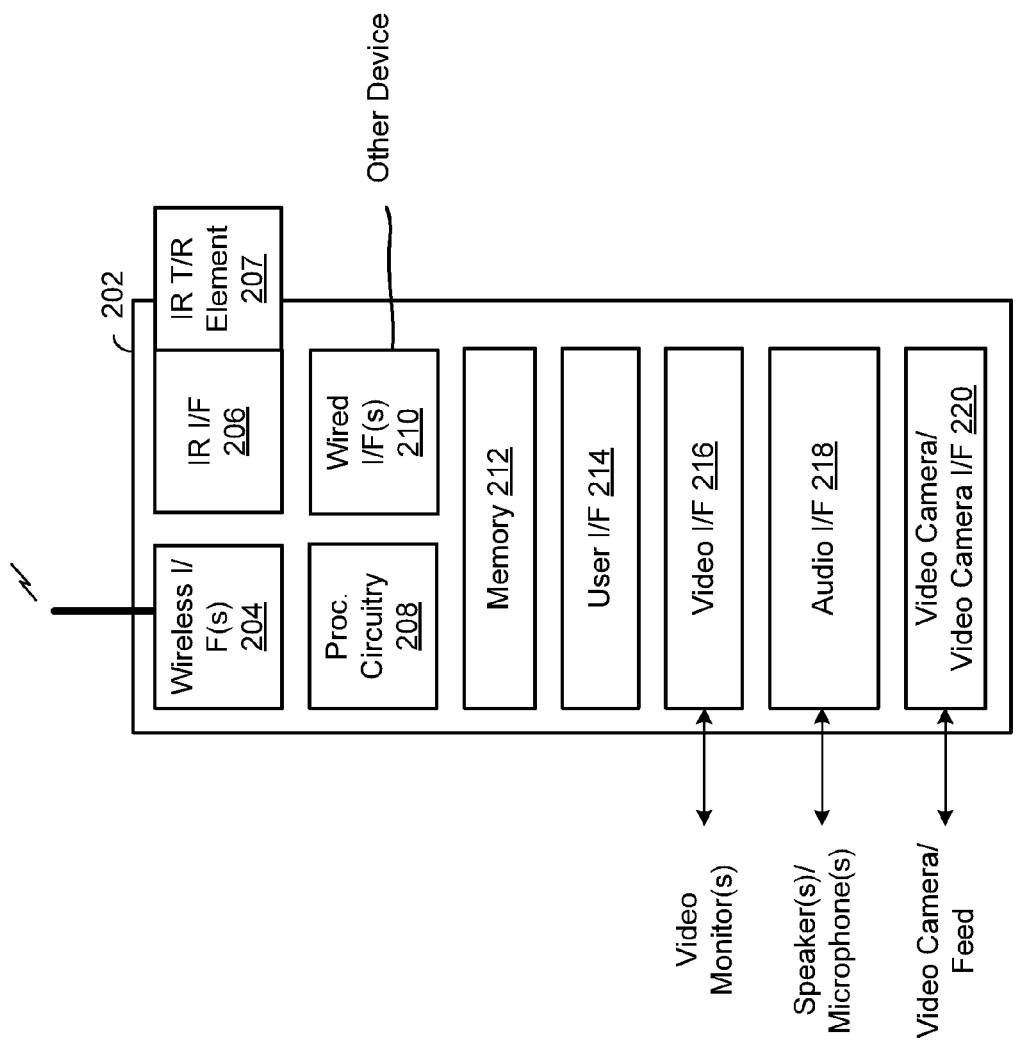
FIG. 2 is a block diagram illustrating a game console constructed according to one or more embodiments of the present invention.

FIG. 2 is a block diagram illustrating a game console constructed according to one or more embodiments of the present invention. The game console 202 of FIG. 2 includes a wireless interface 204, an infrared interface 206, an IR Transmit/Receive element 207, processing circuitry 208, one or more wired interfaces 210, and memory 212. The game console 202 typically would also include a user interface 214, a video interface 216, an audio interface 218, and may include a video camera/video camera interface 220. The wireless interfaces 204 support wireless communications with at least the game controllers 108A, 108B, and 108C described with reference to FIG. 1. This wireless interface may be consistent with a Bluetooth interface, a wireless local area network (WLAN) interface, or another type of wireless communication interface that supports communications between the game console 202 and game controllers. Further, the wireless interface at 204 may support communications with a WLAN router or access point, a cellular infrastructure, a satellite communications network, or another type of wireless communications systems.

The IR interface 206 couples to the IR transmit/receive element 207 and supports IR communications with game controllers 108A, 108B, and 108C as shown in FIG. 1. The IR communications between the game console 202 and the game controllers 108A, 108B, and 108C may support an industry standard or proprietary communications protocol. The processing circuitry 208 may include one or more of a system processor, a digital signal processor, a processing module, dedicated hardware, application specific integrated circuit, or other circuitry that is capable of executing software instructions and for processing data. The memory 212 may be RAM, ROM, FLASH RAM, FLASH ROM, an optical memory, magnetic memory, or other types of memory that is capable of storing data and/or instructions in allowing processing circuitry to access same. The wired interfaces 210 may include a USB interface, a fire wire interface, a serial interface, a parallel interface, an optical interface, or another type of interface supported by a media that is copper, metal, or optical.

The user interface 214 may include keypad, video display, cursor control, touch pad, or other type of interface that allows a user to interface with the game console 202. The video interface 216 couples the game console 202 to one or more video monitors to provide display for the gaming environment supported by game console 202. The communications link between the video interface 216 on the video monitors may be an HDMI interface, a composite video interface, component video interface, an S-video interface, or another type of video interface supported by both the video monitor and the game console 202. The audio interface 218 couples the game console 212 to speakers and/or microphones for audio content delivery and receipt. The video camera/video camera interface 202 may include an onboard video camera or may couple the game console 202 to an external video camera. The external video camera may be used to provide gaming input or other types of information that the game console 202 uses within its operation to produce a gaming environment.

Figure 3B:
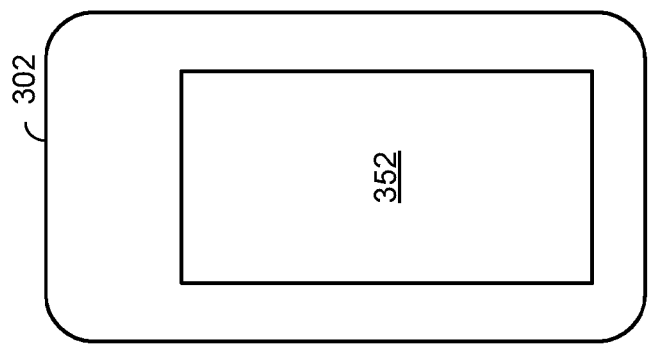
FIG. 3B is a second perspective view of the game controller of FIG. 3A that is constructed according to one or more embodiments of the present invention.
Figure 3A:
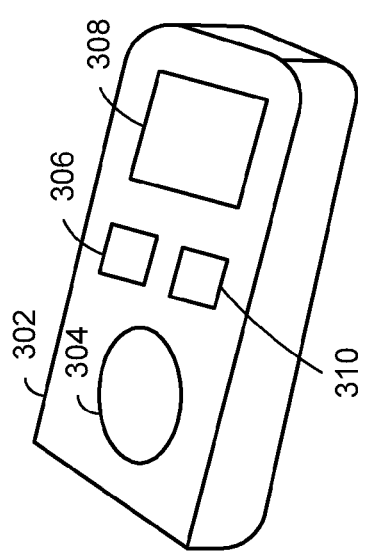
FIG. 3A is a first perspective view of a game controller constructed according to one or more embodiments of the present invention.

FIG. 3A is a first perspective view of a game controller constructed according to one or more embodiments of the present invention. As shown in FIG. 3A, a game controller 302 includes a cursor control 304, mechanical buttons 310 and 306, and may include a touch pad 308. The cursor control 304 may be a touch pad. When 304 and 308 are both touch pads, they receive touch pad input that may be used for user identification, gaming input, or other operations supported by the gaming system and includes game controller 302.

FIG. 3B is a second perspective view of the game controller 302 of FIG. 3A that is constructed according to one or more embodiments of the present invention. As shown in FIG. 3B, a reverse portion of the game controller 302 may include a touch pad 352. The touch pad 352 may wrap around a back portion of the game controller 302. Alternatively, the touch pad 352 may reside on a battery cover of the game controller 302. As will be described further herein, the touch pad 352 includes a plurality of touch pad locations/touch sensitive elements that receive touch pad input that may be used for user ID, gaming input, and/or other purposes.

FIG. 4 illustrates a game controller and coupled secondary game controller, both of which are constructed according to one or more embodiments of the present invention As shown in FIG. 4, primary game controller 402 includes a display 406, a circular input device 408, and button inputs 410, 412, 414, 416, 418, and 420. Any of these input devices 408, 410, 412, 414, 416, 418, and 420 of primary game controller 402 may be touch pads as is further described herein. These touch pads receive gaming inputs in a manner that is consistent with mechanical counterparts that were previously implemented according to prior devices. Further these touch pads may receive input that is used to identify a user or to provide other information.

The primary game controller 402 couples to secondary game controller 404 via either a wired or a wireless interface. The secondary game controller 404 includes input components 421, 422, and 424. These input components 421, 422, and 424 of the secondary game controller 404 may be embodied by either mechanical input devices or touch pads. The manner in which touch pads are implemented are described further herein. Data collected from these input components 421, 422, and 424 are relayed to game controller 402, which may process the inputs. Alternately, the input received from input components 421, 422, and/or 424 may be relayed to a servicing game console. The controllers 402 and/or 404 may include one or more touch pad displays as are further described herein.

Figure 5:
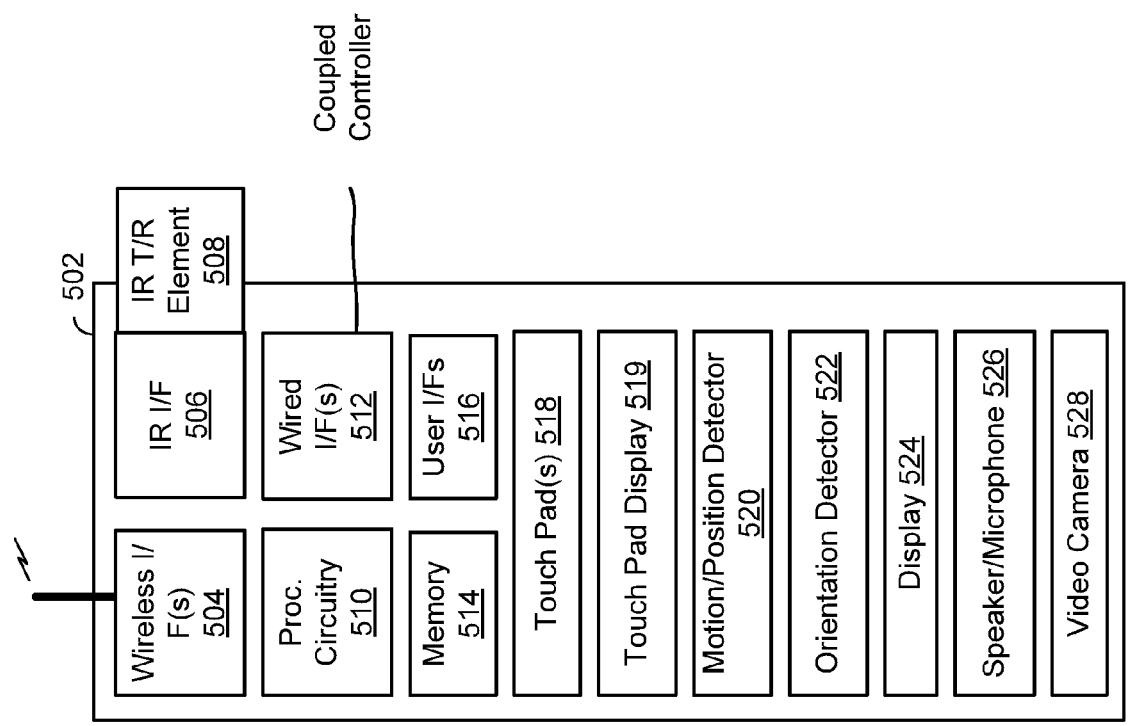
FIG. 5 is a block diagram illustrating a game controller constructed according to one or more embodiments of the present invention.

FIG. 5 is a block diagram illustrating a game controller constructed according to one or more embodiments of the present invention. The game controller 502 includes one or more wireless interfaces 504, an IR interface 506 that includes a IR transmit/receive element 508, processing circuitry 510, wired interface(s) 512, memory 514, and user interface(s) 516. These particular components of the game controller 502 may be similar to the like named components of the game console 302 illustrated in FIG. 3 and described with reference thereto. However, in other embodiments, these like named components may have differing construct/functionality, e.g., smaller memory, less processing capability, lower power wireless interfaces, etc. Thus, commonly named components will not be described further herein as they have been previously described with reference to FIG. 3.

The game controller 502 includes one or more touch pad(s) 518, one or more touch pad display(s) 519, motion/position detector 520, orientation detector 522, display 524, speaker/microphone 526, and a video camera 528. The structure and operations of the touch pads 518 will be described further herein with reference to subsequent FIGs. The motion/position detector 520 detects motion/acceleration of the game controller 502. Detection of such motion/acceleration may be performed in conjunction with the game controller, using a GPS system, using an accelerometer, using a gyrator, and/or using other external components to determine motion/acceleration position of the game controller. The motion/position detector 520 may also determine position of the game controller. The manner in which the motion/position detector 520 determines the position of the game controller 502 is not described further herein. However, the position detector 520 may use external reference devices in order to determine position of the game controller within a gaming environment. Motion, acceleration, and position of the game controller 502 may be provided to a servicing game console as a gaming input.

The orientation detector 522 determines an orientation and/or direction in which the game controller is pointed. Such orientation detection provided by orientation detector 522 may be accomplished in conjunction with the IR interface 506 of the game controller 502. Such orientation detection may be performed in conjunction with the IR detector 106 of the gaming system 100 of FIG. 1.

The display 524 of the game controller 502 may have a relatively small size or relatively large size that presents information to a user and that allows the user to respond accordingly. The speaker/microphone 526 may receive audio input and provide audio output to a user of the game controller 502. Video camera 528 of the game controller may be used to determine a location of the game controller and/or may be used to provide additional gaming input for gaming environments supported by the game controller 502.

According to one particular aspect of the gaming system of FIG. 1, the touch pad(s) 518 of the game controller 502 (and/or game console) may be capacitive, inductive, or RF based. With regard to inputs received via the touch pad of the game controller, the raw data received by a touch pad of the game controller may be fully communicated to the game console of the gaming system. Alternatively, information captured via the touch pad(s) 518 of the game controller may be processed by the processing circuitry 510 of the game controller 502 (or other processing circuitry) prior to communicating such information to the game console 102 of FIG. 1. Such processing may be full or partial to determine whether and what data to upload to the game console. The touch pad display(s) 519 correspond to the touch pad(s) 518 and is/are operable to indicate button functionality or other functionality provided by the touch pad(s) 518 as will be described further herein with reference to FIGS. 10-16. Further, the touch pad(s) 518 may be programmed to correspond to particular user functions, as will also be described herein with reference to FIGS. 10-16.

Referring again to FIG. 4, the touch pad inputs received by game controller may be received at both primary 402 and secondary 404 game controllers of FIG. 4. The inputs received from multiple touch pads on the primary and secondary game controllers 402 and 404 may be received and at least partially processed by processing circuitry of the game controller(s) prior to uploading the data to a game console. The basis for touch pad input processing may be based upon a current usage of the game controllers. For example, the primary game controller 402 may be relevant to a first portion of a user's body while the secondary game controller 404 may be relevant to a second portion of a user's body. In one particular example, teachings of the present invention apply touch pad operations to an input device that receives data corresponding to one or more feet of a user, e.g., secondary controller 404 is a foot pad. In such case, a foot pattern of a user may be employed to identify the user or to receive gaming input from the user within the gaming system.

One purpose of using data received from one or more touch pads according to the present invention is to identify a user of the gaming system. Data captured by one or more touch sensitive pads or panels is used to distinguish a user from a plurality of users based upon finger width, finger length, finger spacing, knuckle joint location, finger angle, and other characteristics of a user's hand/fingers that is used to grasp the game controller. Identification of the user is done based upon pattern matching using various techniques. Further, the touch pad and related operations supported by the structures of the present invention may identify users based upon the heat transfer characteristics, their pulse rate characteristics, and other characteristics that would be gathered via input at a touch pad.

In establishing user characteristic/user ID correspondence, there may be multiple levels of training. With one level of training, a user sets-up his or her identity within the gaming system. Then, a first operation establishes correspondence between touch pad interface characteristics and the user. The gaming system may query a user to confirm that he or she is currently using the game controller with this operation by receiving input from a touch pad interface and then confirming that the particular user identity is correct. Further, the training may proceed so that it is initially intrusive and asks a number of questions of the user but then decreases its intrusions when matching registered users with touch pad input characteristics.

Alternatively, the game controller may simply automatically relate user characteristics as received from a touch pad interface with game characteristics or settings of the gaming system. Generally, the user identification learning process should be as automatic as possible so as not to be burdensome to users of the system. Further, the user identification system of the present invention should delete inactive users from the database so that they are not considered as candidates when determining whether or not a current user is one of a plurality of registered or prior users of a system.

According to another aspect of the present invention, the touch pad input that is used to identify the user may be used in conjunction with auxiliary information to identify a particular user. This auxiliary information may include game usage levels, game selections, time of day at which game is performed, day of week at which game is performed, gyrator input (accelerometer input), coupled secondary gaming devices or service devices, and/or additional auxiliary information. For example, one particular user may select generally games A, B and C while another user may select generally games C, D, and E. Based upon a particular game selection and data input received from a touch pad, the auxiliary information of game selection may be used to further identify the user that is currently using the gaming system. Moreover, a particular user may only use the system during certain times of the day or days of the week and such information is further used to determine identity of the user of the gaming system. Moreover, some users may only use certain auxiliary devices such as nun chucks, guitars, drums, car driving accessories, plane control accessories, or other coupled devices of the game controllers. In such case, the operations of the present invention may use the fact that these devices are coupled to further limit the number of potential users that are considered for identification at a particular time.

Once a user is identified, a user ID is employed to enact a user's custom game data or settings for the gaming system. For example, a particular user is identified and this user's game selection, game settings, and other preferences that have been previously inputted into the game system are automatically enacted. According to another aspect to the present invention, once a user is identified, the gaming environment settings are altered based upon such identification. For example, once the user is identified, the game difficulty level, game entry point, game controller button functions, game controller touch sensitive panel gaming input functions, and/or other custom settings of the gaming system may be altered. In one particular example, once a user is identified, a sequence of touches on the touch sensitive panel may alter some game operation or game selection operations. These particular custom operations are based upon the fact that a particular user is identified as currently operating the gaming system. Further, menus and other user input selections may be altered after a user is identified. For example, the user may have previously indicated that he or she only wants to employ certain games. Once that user is identified then the gaming system would only give that particular user the option of selecting from a list of previously selected games. Further, the user may have customized the menu of the gaming system previously. When the user identified them the customized user interface of the gaming system is enacted.

According to another aspect of the present invention, the touch pad interface is able to determine a relative hand position of the user of the game controller. For example, some types of video games such as tennis or golf require that a user hold the game controller at a particular position. While other games require that the user holds the game controller at a differing position. According to one aspect of the present invention, the game controller and/or the game console is able to determine what position that the user is holding on the game controller. Once this position is identified, the game controller/game console is able to limit the types of games that the user may play based upon the position of the hand with regard to the position of the controller. Thus, the game is customized to some degree based upon a hand position of the user with respect to the controller.

According to another aspect of the present invention, input received via touch sensitive pads or panels may be used for gaming input. For example, the touch sensitive panels may be used to determine that a user has changed his or her hand or finger positions, changed his or her grip positions or otherwise abruptly changed an input to a game controller that is used within a gaming system. Such detection may be used with one scanning rate of the touch sensitive panel. Alternatively, the scanning rate of the touch sensitive panel may be altered based upon a game being played. For example, when the game being played is one that has minimal input requirements the scanning rate may be relatively lower. However, when a game is being played that has a relatively higher input rate such as a fitness program, the scanning rate of one or more touch sensitive panels of one or more game controllers may be increased. Further, scanning of one or more of the touch sensitive panels may be enabled for some portions of the game while not enabled for another portion of the game. For example, grip/finger position movement or pressure changes may be enabled during a first portion of the game and not enabled for other portions of the game. Such is the case because the particular gaming input that is being sensed by changing finger position or grip pressure is only relevant during some portions of the game and not others.

The gaming input may be based upon a change from a prior hand position or a prior relationship between the hand and the game controller and a current position of the hand with respect to the game controller. For example also, a baseline position for the hand with respect to the game controller may be established during a baseline mode of operation. Then, any alteration of the position of the hand with respect to the game controller will serve as a differing gaming input while operation of the game progresses.

Further, each of a plurality of one or more touch sensitive panels of the game controller may be reconfigured by the game console based upon a game being played. Because each game being played may have particular gaming input requirements, the configuration of the touch sensitive panel may be required to be customized for the particular game being played so that the gaming input is most relevant to the particular game. For example, a game in which the touch sensitive panel provides multiple types of input to the game may require a configuration of the touch sensitive panel other than when the game controller touch pad only indicates whether or not the user has picked up the game controller. Further, configuration of the touch sensitive panels may be selected by a user based upon the gaming parameters and/or the configuration of the gaming panels may change at a particular gaming point based upon a selection of the user. Moreover, a configuration of touch panel functions may be based upon the orientation of a controller. For example, when a golf, baseball, tennis or sword input is selected, the touch panel functions may differ for each of the particular types of games. Such is the case because the game controller may be held in different relative positions with respect to the hands for each of these types of games. Thus, the manner in which the touch panels provide gaming input will change based upon not only orientation of the controller but with regard to its simulated game piece function.

Further, each particular game may have its own particular touch input language that implements particular game function(s). Such game touch input language may be considered as a sequence of touches with the touches in particular portions of the touch sensitive panel providing input to the game. The sequence of touches provided to the touch sensitive panel is similar to those that may be provided via sequence of button selections via mechanical buttons of the prior game controller. However, because the touch sensitive panel of the present invention game controller is very configurable and not limited by mechanical button limitations, the touch sensitive panel may be configured at different points in time to have particular touch sequence input functions. This sequence of touch pad inputs may be similar to keypad shortcuts and may be customized by a user.

In another embodiment of the present invention, game controller and game console functionality is merged into a single device, i.e., all-in-one video game platform. This device will also include a display that user views when playing a game supported by the device. The teachings described herein as being jointly performed by a game controller and game console may be accomplished by such a single unit device.

FIG. 6 is a block diagram illustrating a touch sensitive pad and touch pad circuitry constructed according to one or more embodiments of the present invention. A touch pad 602 includes a plurality of touch sensitive elements 604 each of which corresponds to a particular location of the touch pad 602. With the embodiment of FIG. 6, the touch pad includes an array of touch sensitive elements 604, each of which may be a particular capacitively coupled location, inductively coupled location, or a radio frequency (RF) touch sensitive element. Touch pad circuitry 606 couples via a grid structure to the plurality of touch sensitive elements 604 to sense the particular capacitance, inductive, or RF characteristics at each of the touch sensitive elements.

Touch pad circuitry 606 scans the plurality of touch sensitive elements 604 via access of particular row-column combinations at particular times. The frequency or voltage at which the touch pad circuitry 606 scans the plurality of touch sensitive elements 604 may be altered over time. Choosing the scanning frequency or scanning voltage may be based upon a particular operational use of the touch pad. For example, at some points in time the manner in which the touch pad is scanned will change based upon a particular point in a game of a gaming system with which the touch pad functions as a gaming input device. Further, a first scanning frequency/ scanning voltage may be employed for user identification while a second scanning frequency/scanning voltage may be employed for gaming input functions.

The scanning done by the touch pad circuitry 606 of the plurality of touch sensitive elements 604 may be made using a spread spectrum frequency scanning technique. Such technique may be employed to more efficiently capture information from the touch pad 602 at the various touch sensitive elements 604 or to determine which particular scanning frequencies are more successful than others in capturing input information.

Further, the scanning of each row and column corresponding to a particular touch sensitive element 604 may be altered based upon a detected capacitance (inductance/RF propagation) at the location. For example, one particular touch sensitive element 604 may have a fixed capacitance that does not vary over time. Such fixed capacitance may indicate that the particular touch sensitive element 604 is inoperable or that it receives no discernible input. In such case, by not scanning the particular touch sensitive element, other touch sensitive elements may be more frequently scanned or energy may be saved by not scanning all touch sensitive elements.

According to another aspect of the present invention, some portions of the touch pad may be disabled while others are enabled at differing points in time. Enablement of some touch sensitive elements and not others may be based upon a custom configuration of the touch pad for a particular input function provided.

The touch pad 602 may also be calibrated by the touch pad circuitry 606 based upon the environmental factors such as temperature, humidity, and surrounding noise from the capacitance, inductance, or RF perspective. Calibration of the touch pad 602 allows the touch pad 602 to have more efficient and effective touch pad input for user identification and/or for other input purposes.

The touch pad 602 may also be calibrated by the touch pad circuitry 606 based upon the environmental factors such as temperature, humidity, and surrounding noise as detected by measured capacitance, inductance, or RF propagation characteristics. Calibration of the touch pad 602 allows the touch pad 602 to be more efficient and more effectively receive touch pad input for user identification and/or for other input purposes. The calibration of the touch pad 602 by the touch pad circuitry 606 may be initiated at particular points in time. The touch pad circuitry 606 may simply initiate calibration of the touch pad 602 upon the expiration of a timer such that the touch pad is calibrated at a particular regular time interval. Alternatively, the touch pad 602 may be calibrated after a period of inactivity, i.e., the touch pad circuitry 606 performs calibration when it determines that no input is present on the touch pad 602. With other operations or embodiments, the touch pad 602 may be calibrated by the touch pad circuitry 606 using other input criteria as well.

Figure 7B:
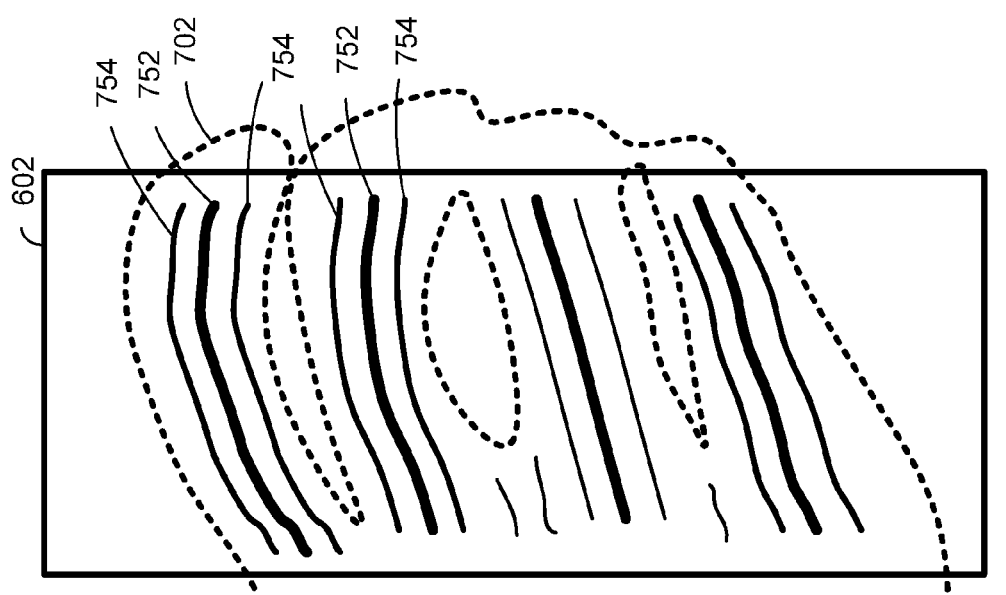
FIG. 7B is a diagram illustrating the manner in which a user's hand upon the touch sensitive pad and may produce a particular pattern of capacitance upon the touch sensitive pad.
Figure 7A:
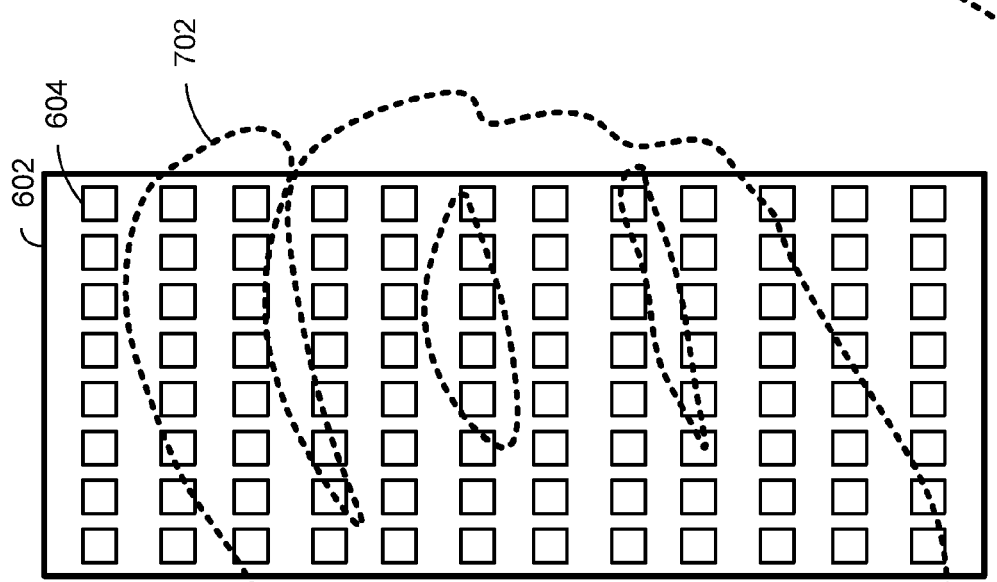
FIG. 7A is a diagram illustrating how a user's hand may overlay a touch sensitive pad according to one or more embodiments of the present invention.

FIG. 7A is a diagram illustrating how a user's hand may overlay a touch pad according to one or more embodiments of the present invention. The touch pad 602 has a plurality of touch sensitive elements 604 and is mounted upon a portion of a vehicle so that it is adjacent a user's hand when the user holds the portion of the vehicle. The outline 702 of users hand is shown as overlaying the touch pad 602 and the plurality of touch sensitive elements 604. While the touch pad 602 of FIG. 7A is generally illustrated as planar, the touch pad 602 may wrap around a steering wheel, gear shifter, door handle, or another vehicle component.

FIG. 7B is a diagram illustrating the manner in which a user's hand upon the touch pad produces a particular pattern of capacitance (inductance/RF propagation) upon the touch pad. A relative capacitance, inductance, or RF propagation pattern of the user's hand 702 is shown on touch pad 602. The depiction in FIG. 7B is illustrated in general only of relative capacitance at each of the user's finger location positions upon the touch pad 602. For example, where the user's fingers touch physically the touch pad 602, stronger capacitance lines 752 and 754 are shown. Where the user's fingers overlay the touch pad 602, lesser capacitance, inductance, or RF propagation characteristic lines 754 are shown. While other capacitance lines on the touch pad 602 are not shown in FIG. 7B are numbered, the various capacitance lines would be present for the other fingers as well.

The capacitance pattern of the user's hand 702 upon the touch pad 602 is a signature of a particular user. The size of user's hands, the positions of their knuckles, the relative angle at which they grip the location in the vehicle. Thus, based upon this variation of the capacitive pattern upon the touch screen 602, differing users can be identified. Further, considering that the touch pad 602 may serve as an input device, the capacitance of the touch sensitive elements 604 of the touch pad of 602 over time as it varies may be used to indicate touch pad input. Based upon the scanning frequency, the scanning voltage, and other scanning factors of the touch pad 602 at the various touch sensitive elements 604, the characteristics measured at each touch sensitive element 604 over time will enable the device to identify a user or to try particular input via the touch pad 602.

Further, each of a plurality of touch sensitive pads of the game controller may be reconfigured by the game console based upon a game being played. Because each game being played may have particular gaming input requirements, the configuration of the touch pad may be required to be customized for the particular game being played so that the gaming input is most relevant to the particular game. For example, a game in which the touch pad provides multiple types of input to the game may require a configuration of the touch pad other than when the game controller touch pad only indicates whether or not the user has picked up the game controller. Further, configuration of the touch pads may be selected by user based upon the gaming parameters. For example, the configuration of the gaming panels may change at a particular game point based upon a selection of the user.

Moreover, configuration of touch pad functions may be based upon the orientation of a controller. For example, when a golf, baseball, tennis or sword input is selected, the touch pad functions may differ for each of the particular types of games. Such is the case because the game controller may be held in different relative positions with respect to the hands for each of these types of games. Thus, the manner in which the touch pads provide gaming input will change based upon not only orientation of the controller but with regard to its simulated game piece function.

Further, each particular game may have its own particular touch input language that implements particular game function(s). Such game touch input language may be considered as a sequence of touches with the touches in particular portions of the touch pad providing input to the game. The sequence of touches provided to the touch pad is similar to those that may be provided via sequence of button selections via mechanical buttons of the prior game controller. However, because the touch pad of the present invention game controller is very configurable and not limited by mechanical button limitations, the touch pad may be configured at different points in time to have particular touch sequence input functions.

The apparatus of FIGS. 1-6 can singularly or jointly perform the operations of the following FIGS. 8-16. With some of these FIGs. processing performed is not identified as being performed by a particular device. In such case the processing may be performed by one or both of a game controller and/or a game console. In other operations the processing or operations performed are attributed to one of a game console or game controller. In such cases, the processing could alternatively be performed by the other of the game console or game controller or jointly by the game console and game controller. In still other embodiments, the operations of FIGS. 8-16 are performed by a single case video gaming system.

Referring to FIG. 6, the operations of the touch pad circuitry 606 change based upon its operational condition. The touch pad configuration settings that correlate subsets of a plurality of touch sensitive elements can be enacted to respective distinct user input locations. Touch pad input is received from at least one touch sensitive pad. The touch pad input corresponds to a user's touch of at least some of the plurality of touch sensitive elements. The touch pad input is processed to determine user input directions based upon the touch pad configuration settings. The user input directions are transmitted to a game console via the communications interface for use as gaming input.

FIG. 8 is a flowchart illustrating operations 800 of a game controller and a game console to receive and process touch pad input according to one or more embodiments of the present invention. The operations 800 of FIG. 8 begin when touch pad input is received from at least one touch sensitive pad of a game controller, step 802. As previously shown, the at least one touch sensitive pad of a game controller has a plurality of touch sensitive elements. Each of these touch sensitive elements is individually scanned to detect capacitance, inductance, or RF propagation characteristics of the touch sensitive element.

The touch pad input corresponds to a user's touch of at least some of the plurality of touch sensitive elements. The touch pad input is processed by processing circuitry of the game controller, step 804. The game controller may perform first processing operations on the touch pad input and transmit the touch pad input to the game console for second processing operations such that processing operations on the touch pad input are shared between the game controller and the game console. Alternately the game controller may simply transmit raw touch pad input to the game console for processing. In still other operations, all processing of the touch pad input is performed by the game controller.

The at least partially processed touch pad input is transmitted to the game console via a communications interface of the game controller, step 806. The game console processes the touch pad input for user identification, gaming input, game operation alterations (e.g. power down game, pause game, game settings, and the like), step 808. The game console may then direct the game controller to alter its operations at step 810, including altering operations of the touch sensitive pad.

FIG. 9 is a flowchart illustrating other operations 900 of a game controller and a game console to receive and process touch pad input according to one or more embodiments of the present invention. Operations 900 begin with receiving first touch pad input from a first touch sensitive pad of a game controller, step 902. First touch pad input is received via a first touch pad that has a first plurality of touch sensitive elements. Second touch pad input is then received from a second touch pad of the game controller or from a touch pad of a second game controller that communicatively couples to the first game controller, step 904. The second touch pad input is separate and distinct from the first touch pad input. The first and second touch pad inputs are processed and/or combined to produce combined touch pad input, step 906.

The first touch pad input may be user finger touch pad input, user thumb touch pad input, user hand touch pad input, or a combination of these. The user finger touch pad input can be combined with the user thumb touch pad input to produce combined user touch pad input. Further, the first touch pad input may be captured by a touch pad of the first game controller and the second touch pad input may be captured by a touch pad of the second game controller and combined to produce the combined touch pad input. In such case, the first touch pad input may be from a first hand of a user and the second touch pad input may be from a second hand of the user (or from the hand of another user). Alternately, the first touch pad input may be of a hand of the user and the second touch pad input may be of a foot of the user. Of course, the teachings of the present invention apply to other combinations of input(s) as well.

The combined touch pad input is transmitted to the game console via a communications interface of the game controller, step 908. The game console then uses the touch pad input for user identification, gaming input, game operation alterations (e.g. power down game, pause game, game setting, and the like), step 910. The game console may direct the game controller to alter operations of at least one touch sensitive pad, step 912.

In one embodiment, initial operational parameters are set for the least one touch sensitive pad of the game controller by either the game controller or the game console. Based upon further input received by the game controller, the operations of the touch sensitive pad are altered. It is understood that the game console could make the decision to direct the game controller to alter operations of at least one touch sensitive pad, as will be described herein, even though the game controller may make such operational decisions alone.

Figure 10:
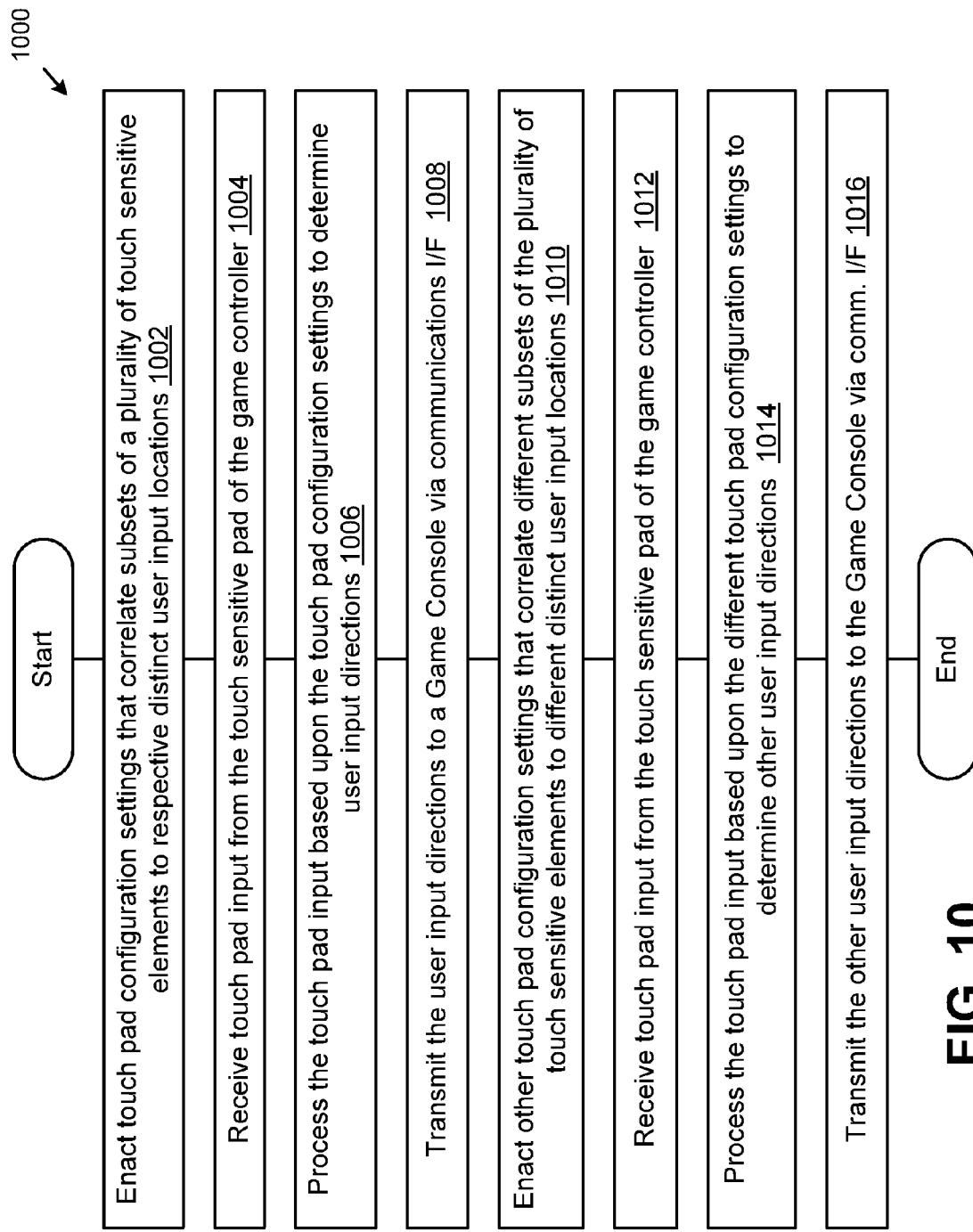
FIG. 10 is a flowchart illustrating other operations of a game controller and a game console to receive and process touch pad input according to one or more embodiments of the present invention.

FIG. 10 is a flowchart illustrating other operations 1000 of a game controller and a game console to receive and process touch pad input according to one or more embodiments of the present invention. The game controller has a communications interface, at least one touch sensitive pad having a plurality of touch sensitive elements, and processing circuitry coupled to the communications interface and to the at least one touch sensitive pad. Operations 1000 begin with touch pad configuration settings being enacted that correlate subsets of the plurality of touch sensitive elements to respective distinct user input locations, step 1002. These touch pad configuration settings may have been received from the game console in a touch pad configuration settings message. Alternately, when the game controller is an all in one device, the touch pad configuration settings may be internally generated. Touch pad input is received from the touch sensitive pad of the game controller, step 1004. The touch pad input corresponds to a user's touch of at least some of the plurality of touch sensitive elements. The touch pad input is processed based upon the touch pad configuration settings to determine user input directions, step 1006.

The reader should understand that the user input directions are determined by the game controller based upon both the user's touch of one or more particular touch sensitive elements of the touch pad and the touch pad configuration settings, which correlate subsets of the plurality of touch sensitive elements to respective distinct user input locations. The user input directions may be gaming input, keypad input, or other input, even though referred to as "gaming input" herein. The touch pad configuration settings correlate the touch sensitive elements, each of which correlates to a particular location of the touch pad to user input functions.

An example of such a correlation of touch pad elements/locations to user input directions is when a touch pad replaces North-South-East-West multiple button functionality. In such case, the touch pad configuration settings cause a correspondence to exist between particular touch sensitive elements and each of the North-South-East-West button functions. Then, the game controller receives the touch pad input at step 1004 and processes the touch pad input at step 1006 to determine how the touch pad input causes the user input functions. Some touch pad input causes the user input function to correlate to a "North" button depression. Other touch pad input causes the user input function to correlate to a "South" button depression. Of course, the touch pad configuration settings could cause the touch pad to have differing button replacement functionality as well, causing equivalent touch pad input to result in differing user input directions. Once processing is completed at step 1006, the user input directions are transmitted to a game console via communications interface, step 1008.

Other touch pad configuration settings are then enacted that correlate different subsets of the plurality of touch sensitive elements to different distinct user input locations, step 1010. The touch pad configuration settings can be determined from/received in a touch pad configuration settings message received from the game console. The other touch pad configuration settings differ from the touch pad configuration settings. These other touch pad configuration settings may be enacted upon reaching a differing portion of a video game, upon playing a different video game, upon exiting or entering a video game, or based upon a different input function phase of usage of the game controller. These other touch pad configuration settings may be enacted based upon receipt of another touch pad configuration settings message received from the game console via the communications interface.

Touch pad input is then received from the touch sensitive pad of the game controller, step 1012. The touch pad input is processed based upon the different touch pad configuration settings to determine other user input directions, step 1014. The other user input directions are transmitted to the game console via communications interface, step 1016.

Figure 11:
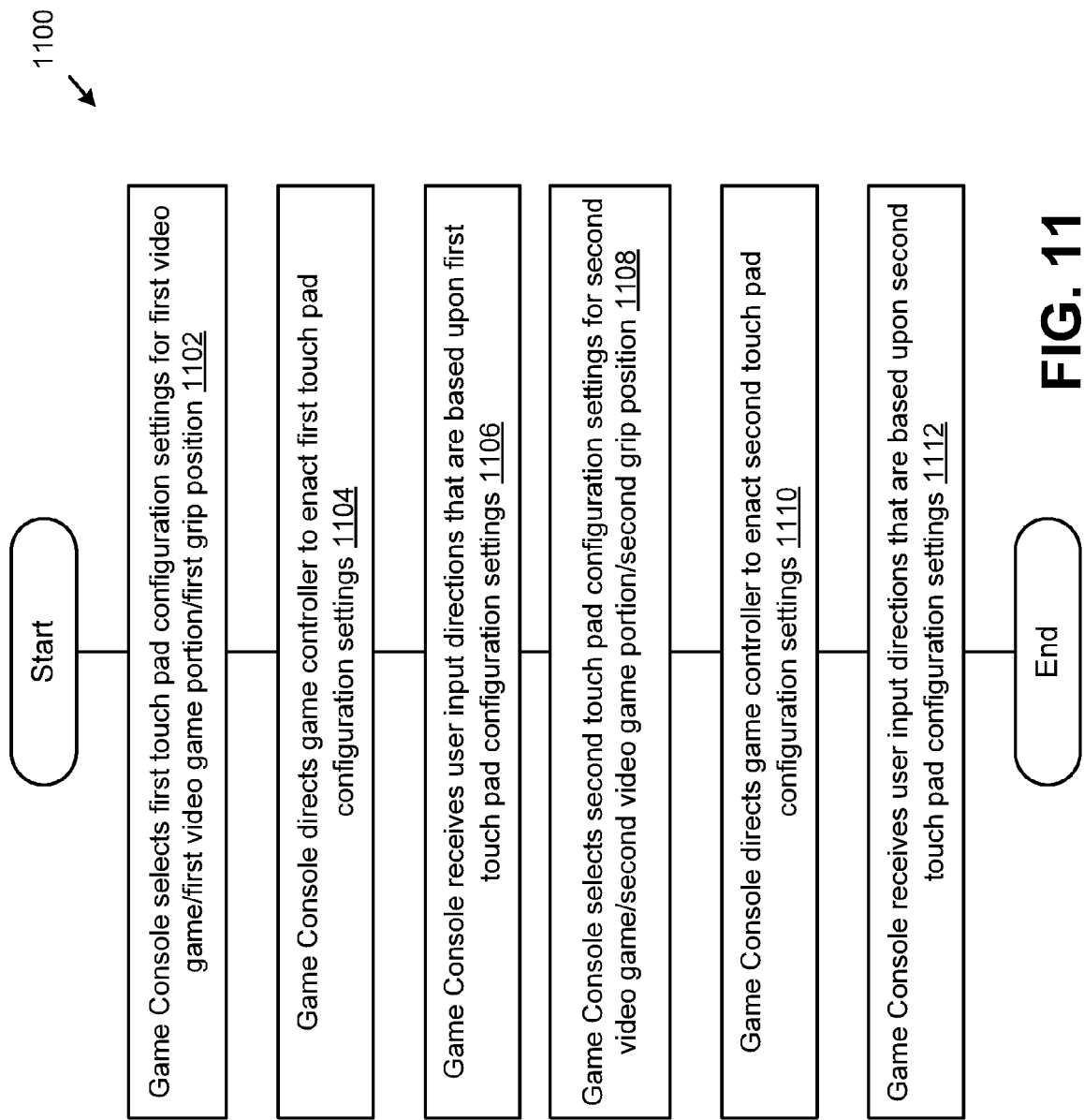
FIG. 11 is a flowchart illustrating other operations of a game controller and a game console to receive and process touch pad input according to one or more embodiments of the present invention.

FIG. 11 is a flowchart illustrating other operations 1100 of a game controller and a game console to receive and process touch pad input according to one or more embodiments of the present invention. Operations 1100 begin with first touch pad configuration settings being selected by the game console for a first video game/first video game portion/first grip position, step 1102. The game console directs the game controller to enact first touch pad configuration settings using a touch pad configuration settings message, for example, step 1104. The game console then receives user input directions that are based upon first touch pad configuration settings, step 1106. The game console next selects second touch pad configuration settings for second video game/second video game portion/second grip position, step 1108. The game console directs the game controller to enact second touch pad configuration settings, in a touch pad configuration settings message, for example, step 1110. The game console then receives user input directions that are based upon second touch pad configuration settings, step 1112. As was previously described, the touch pad configuration settings correlate subsets of the plurality of touch sensitive elements to respective distinct user input locations. Thus, identical touch pad input received at a touch pad could result in differing user input directions for differing touch pad configuration settings. Such operations are beneficial in that the same touch pad may be used to support many different input functions, solely by altering the touch pad configuration settings.

Figure 12:
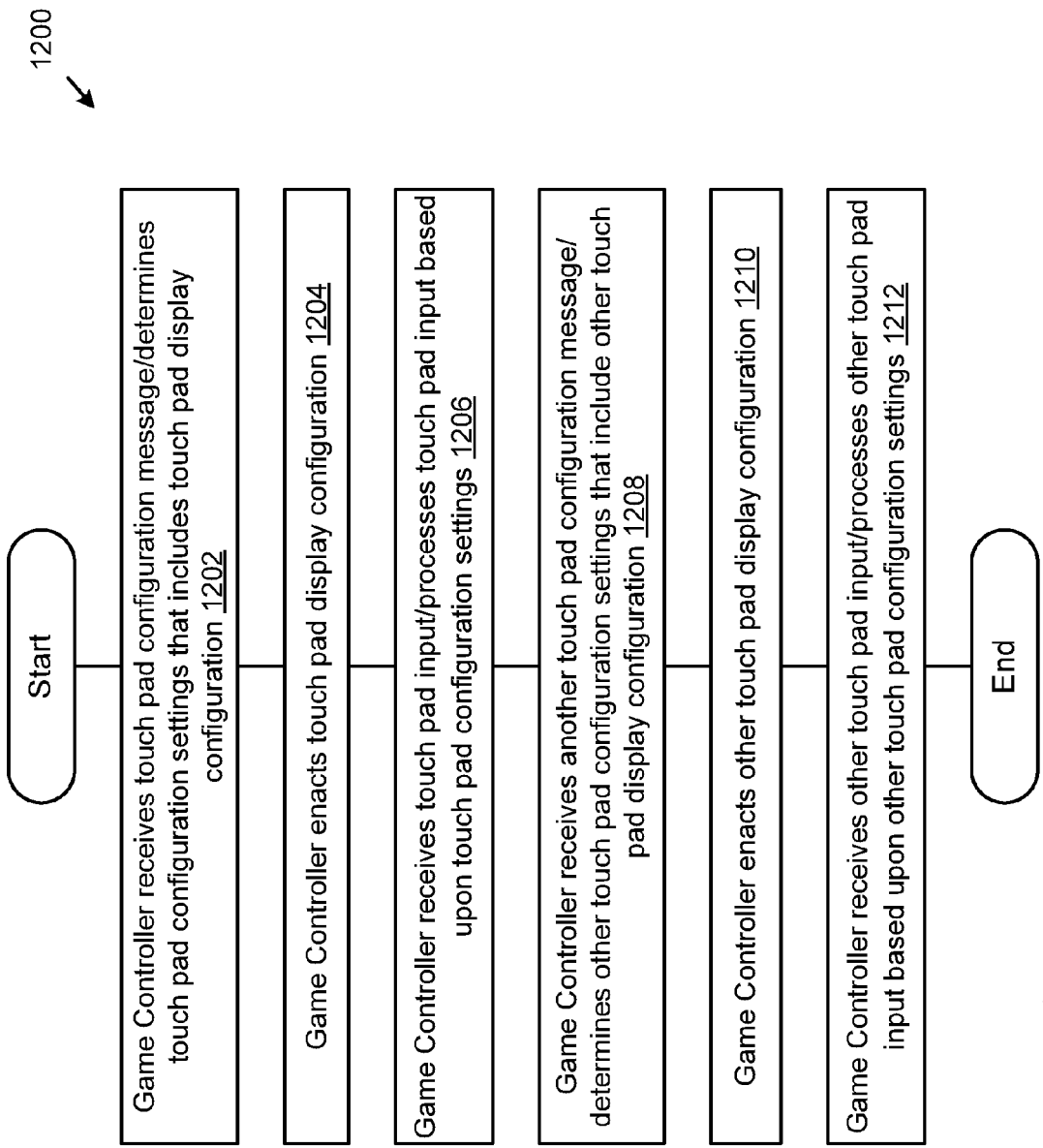
FIG. 12 is a flowchart illustrating operations of a game controller to receive and process touch pad input and to control a touch pad display according to one or more embodiments of the present invention.

FIG. 12 is a flowchart illustrating operations 1200 of a game controller to receive and process touch pad input and to control a touch pad display according to one or more embodiments of the present invention. The touch pad display has a plurality of display elements that may be configured to display at least one simulated button. Each simulated button corresponds to a plurality of touch sensitive elements. With the operations 1200 of FIG. 12, when a touch pad configuration is enacted, the processing circuitry causes the at least one simulated button to be illuminated by the touch pad display.

In FIG. 12, the game controller receives a touch pad configuration message and determines touch pad configuration settings, including a touch pad display configuration, step 1202. The game controller enacts the touch pad display configuration, step 1204. The game controller receives touch pad input, and processes the touch pad input based upon the touch pad configuration settings, step 1206. The game controller receives another touch pad configuration message and determines other touch pad configuration settings that include another touch pad display configuration, step 1208. The game controller enacts other touch pad display configuration, step 1210. The game controller receives other touch pad input, and processes the other touch pad input based upon other touch pad configuration settings, step 1212.

Generally, and as will be described further with reference to FIGS. 13-16, the touch pad display is employed to cause button functionality and/or other input functionality to be represented in conjunction with the touch pad. This button functionality allows the touch pad to be configured and reconfigured for differing uses with different video games, different portions of a video game, for non-gaming functions, and for other functions.

Figure 13:
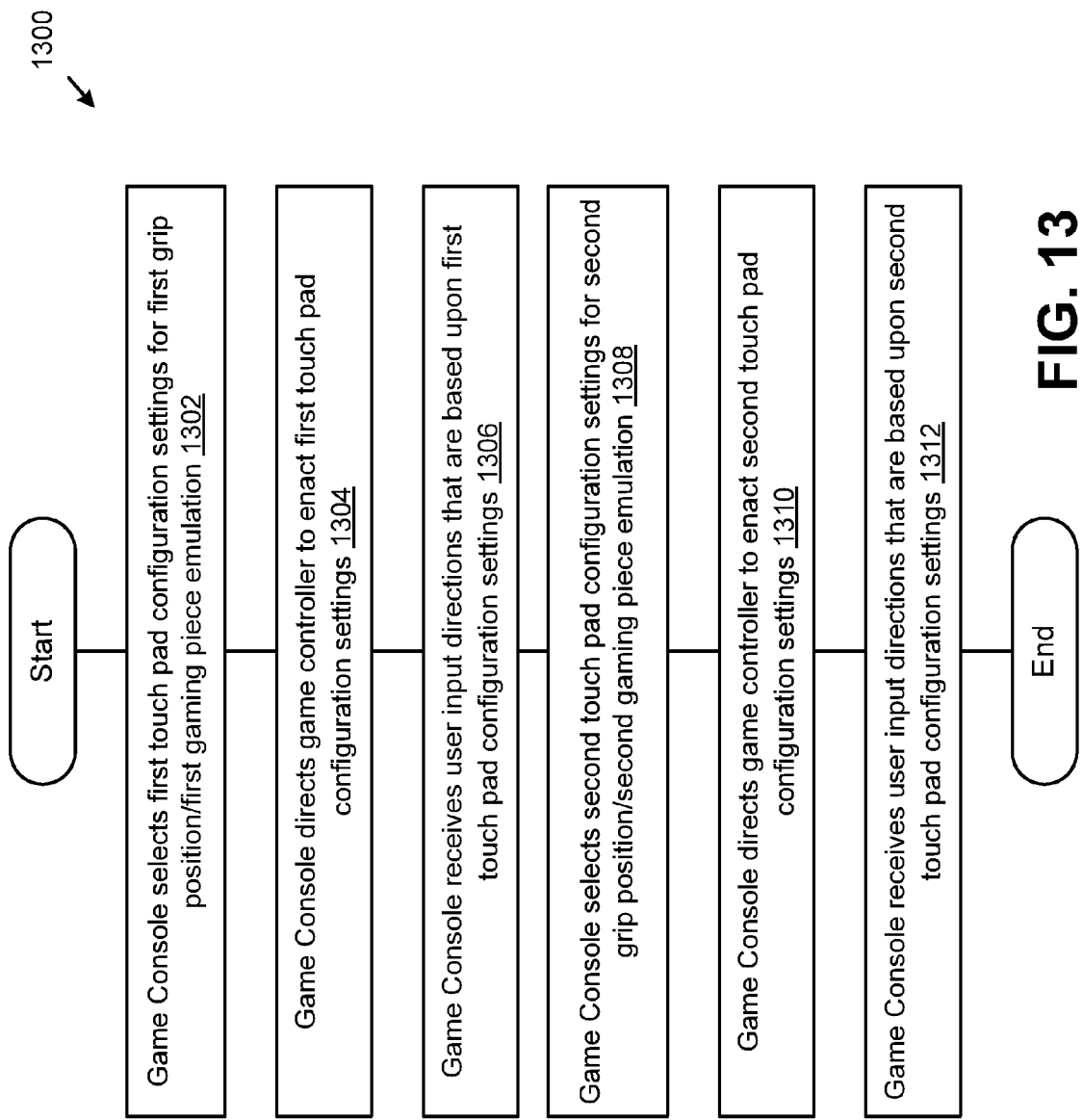
FIG. 13 is a flowchart illustrating other operations of a game controller and a game console to select and direct touch pad configuration settings according to one or more embodiments of the present invention.

FIG. 13 is a flowchart illustrating other operations 1300 of a game controller and a game console to select and direct touch pad configuration settings according to one or more embodiments of the present invention. Touch pad configuration settings are enacted that correlate subsets of the plurality of touch sensitive elements to respective distinct user input locations. The processing circuitry enacts first touch pad configuration settings for a first grip position of the game controller, and enacts second touch pad configuration settings for a second grip position of the game controller. The first touch pad configuration settings can be enacted when the game controller emulates a first gaming piece. The second touch pad configuration settings can be enacted when the game controller emulates a second gaming piece that differs from the first gaming piece. The gaming pieces can be one or more of a golf club, a tennis racquet, a baseball bat, a sword, a guitar, a gun, and a knife.

In FIG. 13, operations 1300 begin with the game console selecting first touch pad configuration settings for first grip position/first gaming piece emulation, step 1302. The game console directs the game controller to enact first touch pad configuration settings, step 1304. The game console receives user input directions that are based upon first touch pad configuration settings, step 1306. The game console selects second touch pad configuration settings for second grip position/second gaming piece emulation, step 1308. The game console directs game controller to enact second touch pad configuration settings, step 1310. The game console receives user input directions that are based upon second touch pad configuration settings, step 1312, and the process ends.

Figure 14:
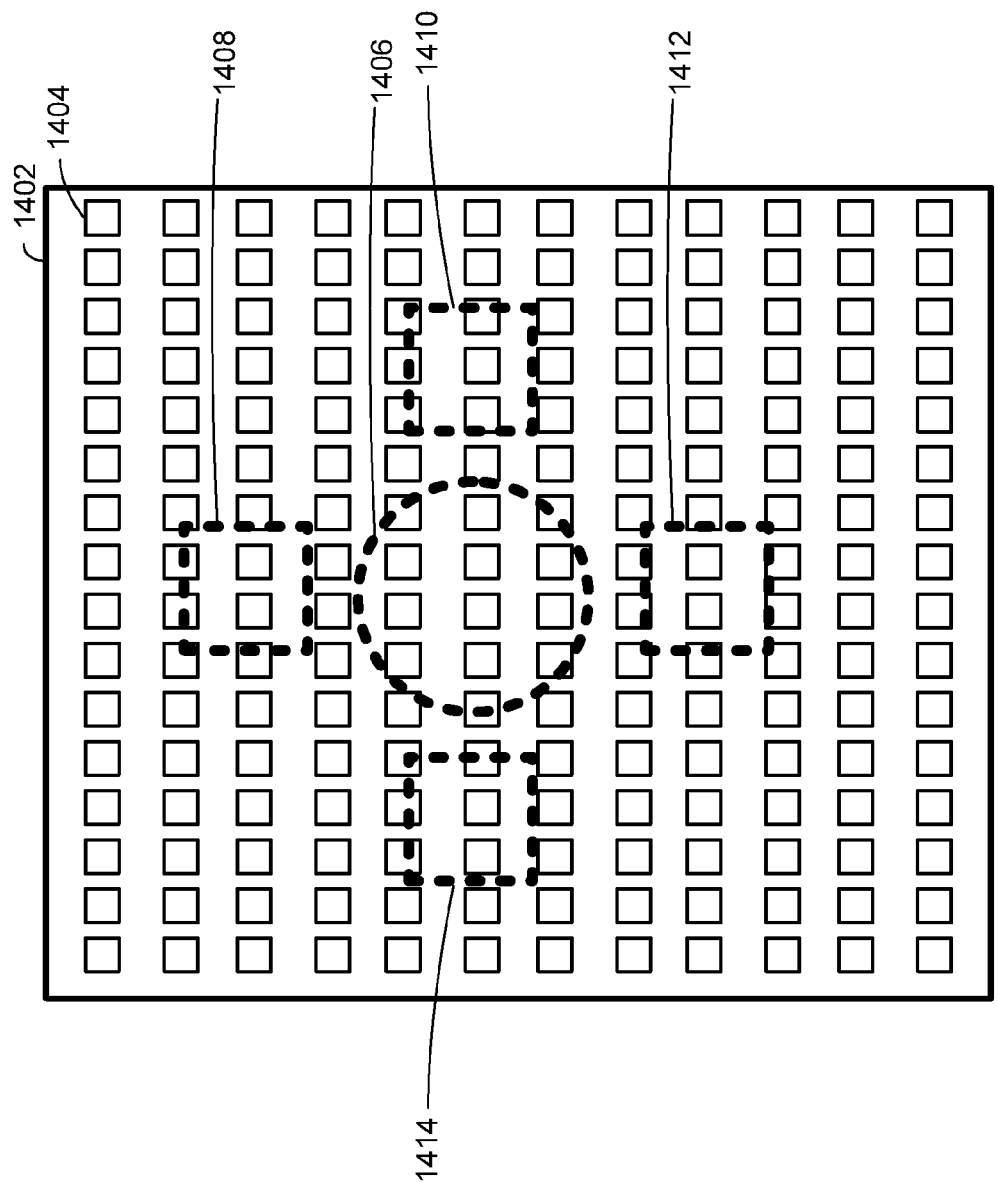
FIG. 14 is a diagram illustrating a touch pad including a plurality of display elements of a touch pad display that are controllable to illustrate elements corresponding to buttons or other components of a game controller according to one or more embodiments of the present invention.

FIG. 14 is a diagram illustrating a touch pad including a plurality of display elements of a touch pad display that are controllable to illustrate elements corresponding to buttons or other components of a game controller according to one or more embodiments of the present invention. The touch sensitive pad 1402 includes a plurality of touch sensitive elements 1404 and also includes the ability of the touch sensitive pad to serve as a button replacement device. A touch sensitive display corresponding to the touch sensitive pad 1402 has a plurality of display elements operable to represent buttons visually to a user, the buttons corresponding to a mechanical game control input pattern. Such pattern includes indicated touch locations 1406, 1408, 1410, 1412, and 1414. Such locations may correspond to a mechanical game control input pattern that is subsequently used for gaming input. For example, each of these simulated buttons 1406-1414 may have a particular game input control function and serve as such via the touch sensitive pad 1402. Thus, each of the touch sensitive pads if there are multiple of the touch sensitive pads on the game controller may replace button functions of prior controllers. With the example of FIG. 14, North, South, East, West directional control replaces a similar function mechanical control. Each of the touch sensitive pads 1402 may have a control touch pad display to indicate the button positions and functionality of each for the simulated mechanical input functions replaced by the touch sensitive pad 1402.

Figure 15:
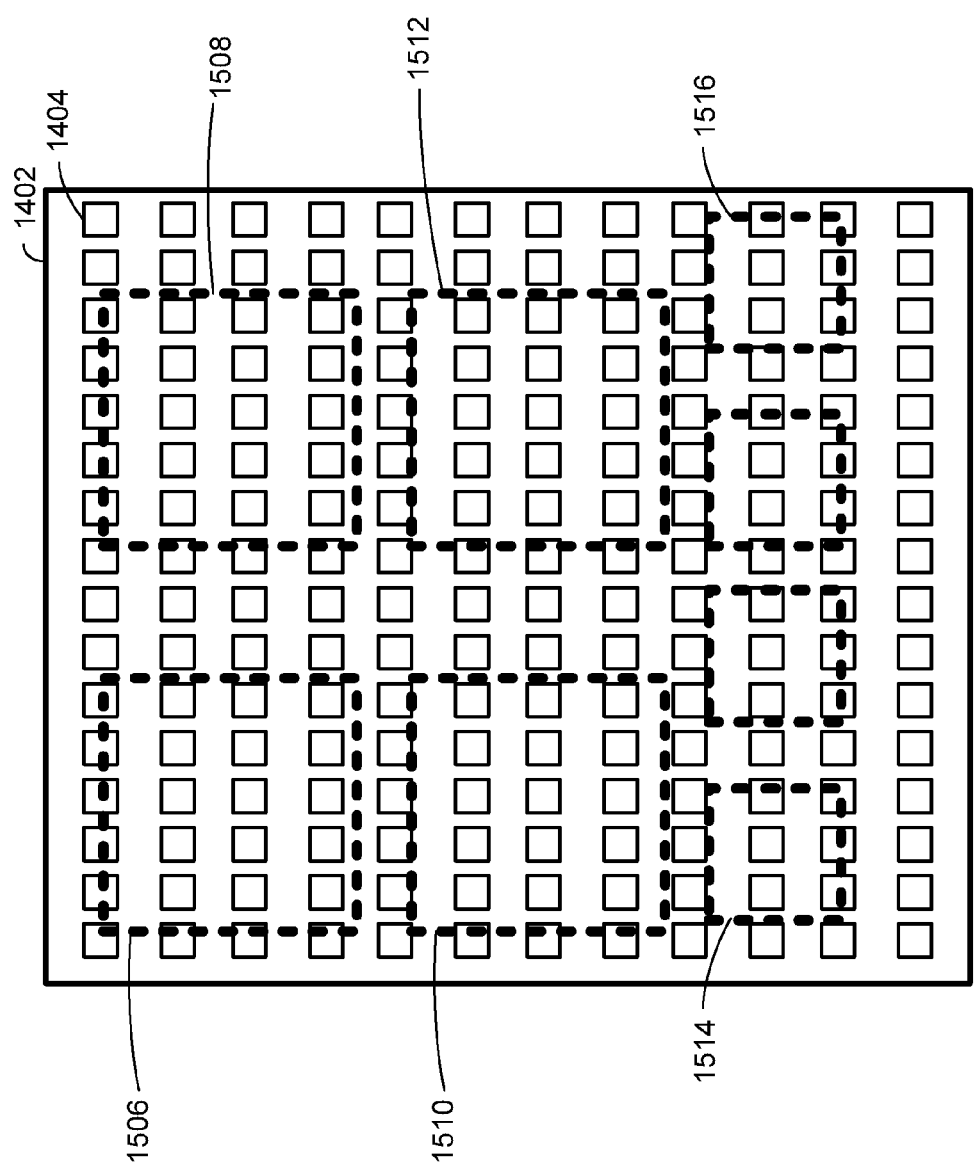
FIG. 15 is another diagram illustrating a game controller with display elements of the touch pad display configured differently than those in FIG. 14.

FIG. 15 is another diagram illustrating a game controller with display elements of the touch pad display configured differently than those in FIG. 14. The second configuration of the touch sensitive pad 1402 with a differing illumination of display elements includes simulated buttons or touch locations 1506, 1508, 1510, 1512, and 1514-1516. With the displayed buttons, the touch sensitive pad 1402 and its plurality of touch sensitive elements 1404 has been reconfigured to another set of input locations or devices. Thus, referring to both FIGS. 14 and 15, the touch sensitive pad 1402 may be reconfigured by a game console, the game controller itself, or remote control based upon a game being played or based upon a particular desire configuration of the touch sensitive pads to simulate mechanical input components or to simply be a customized touch sensitive pad interface.

The touch sensitive pad 1402 may be configured by the user based upon a preference for game parameter inputs. Alternatively, the touch sensitive pad 1402 may be customized based upon the particular game being played so that it has functionality for input corresponding to the particular game itself. For example, the configuration of the touch sensitive pad 1402 functions may be based upon an orientation of the controller and how it relates to the particular game being played, e.g., golf, baseball, tennis, a sword input, etc. Further, when the touch sensitive pad 1402 is configured for specialized operations so as to depict particular buttons that are available to be depressed, the touch sensitive elements 1404 may be selectively scanned as to only provide input or receive input from the touch sensitive elements 1404 corresponding to particular buttons. As an example of FIG. 15, the touch sensitive pad 1402 may be scanned so as to only scan touch sensitive elements 1404 corresponding to buttons 1506, 1508, 1510, 1512, and 1514-1516.

Figure 16:
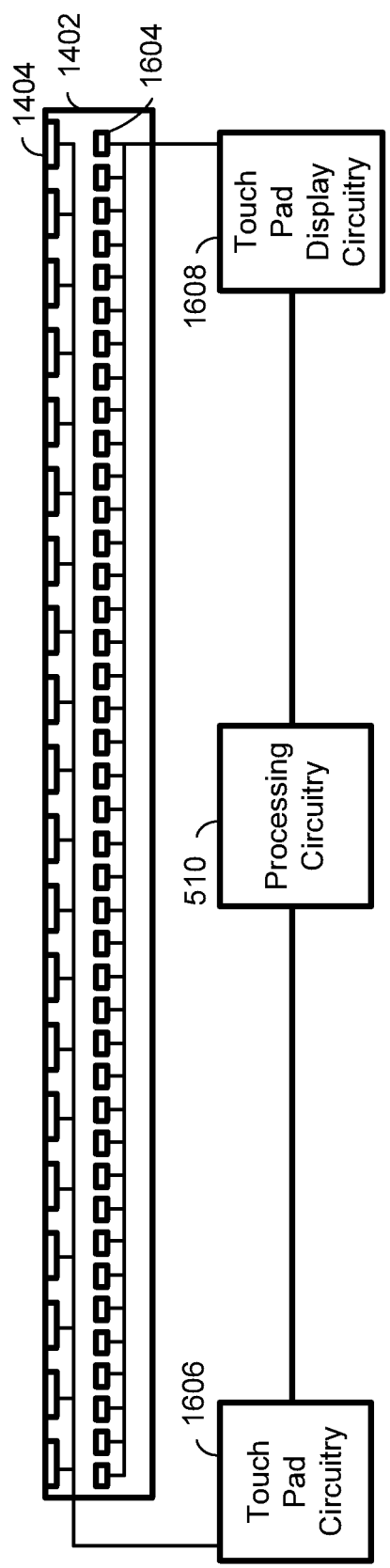
FIG. 16 is a diagram illustrating a touch sensitive pad, a touch pad display, touch pad circuitry and touch pad display circuitry constructed according to one or more embodiments of the present invention.

FIG. 16 is a diagram illustrating a touch sensitive pad, a touch pad display, touch pad circuitry and touch pad display circuitry constructed according to one or more embodiments of the present invention. A touch sensitive pad 1402 includes a plurality of touch sensitive elements 1404, each of which corresponds to a particular location of the touch sensitive pad 1402. Touch pad circuitry 1606 couples to the plurality of touch sensitive elements 1404, and to processing circuitry 510 and touch pad display circuitry 1608. Touch pad circuitry 1606 scans the plurality of touch sensitive elements 1604. The touch pad display includes a plurality of touch pad display elements 1604 that may be selectively controlled to create buttons and/or other icons to a user, such buttons and/or other icons relating to corresponding touch pad elements.

Touch pad configuration settings are enacted that correlate subsets of the plurality of touch sensitive elements 1404 to respective distinct user input locations. The respective distinct user input locations may be indicated by the touch pad display elements 1604 indications. The processing circuitry 510 enacts touch pad configuration settings that were previously described herein. The processing circuitry 510 causes the touch pad circuitry 1606 and/or the touch pad display circuitry 1608 to operate particularly based upon the touch pad configuration settings.

For example, the processing circuitry 510 enacts first touch pad configuration settings for a first grip position of the game controller, and enacts second touch pad configuration settings for a second grip position of the game controller. The first touch pad configuration settings can be enacted when the game controller emulates a first gaming piece. The second touch pad configuration settings can be enacted when the game controller emulates a second gaming piece that differs from the first gaming piece. According to one embodiment of the invention, the gaming pieces can be one or more of a golf club, a tennis racquet, a baseball bat, a sword, a guitar, a gun, and a knife.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A game controller comprising:
a communications interface;
a touch sensitive pad having a plurality of touch sensitive elements; and
processing circuitry coupled to the communications interface and to the touch sensitive pad, the processing circuitry operable to:
enact, responsive to a user identity produced through the touch sensitive pad, touch pad configuration settings that correlate subsets of the plurality of touch sensitive elements to produce at least one distinct user input location configured to simulate at least one mechanical interface function;
receive touch pad input from the touch sensitive pad, the touch pad input corresponding to a user's touch of at least some of the plurality of touch sensitive elements;
process the touch pad input to determine user input directions based upon the touch pad configuration settings; and
transmit the user input directions via the communications interface; and
a touch pad display coupled to the processing circuitry and corresponding to the touch sensitive pad, the touch pad display configured to display a simulated button corresponding to at least a portion of the at least one mechanical interface function, the simulated button corresponding to a subset of the plurality of touch sensitive elements, wherein in the enacting the touch pad configuration settings, the processing circuitry is operable to cause the simulated button to be illuminated by the touch pad display.

2. The game controller of claim 1, wherein the enacting touch pad configuration settings that correlate subsets of the plurality of touch sensitive elements to produce the at least one user input location, the processing circuitry is operable to:
receive a touch pad configuration settings message via the communications interface; and
determine the touch pad configuration settings from the touch pad configuration settings message.

3. The game controller of claim 2, wherein the processing circuitry is further operable to:
receive another touch pad configuration settings message via the communications interface;
determine other touch pad configuration settings from the another touch pad configuration settings message, the other touch pad configuration settings differing from the touch pad configuration settings; and
enact the other touch pad configuration settings that correlate subsets of the plurality of touch sensitive elements to produce another distinct user input location.

4. The game controller of claim 1, wherein in the enacting touch pad configuration settings that correlate subsets of the plurality of touch sensitive elements to produce at the least one user input location, the processing circuitry is operable to:
enact first touch pad configuration settings for a first video game; and
enact second touch pad configuration settings for a second video game.

5. The game controller of claim 1, wherein in the enacting touch pad configuration settings that correlate subsets of the plurality of touch sensitive elements to produce the at least one user input location, the processing circuitry is operable to:
enact first touch pad configuration settings for a first portion of a video game; and
enact second touch pad configuration settings for a second portion of the video game.

6. The game controller of claim 1, wherein in the enacting the touch pad configuration settings that correlate the subsets of the plurality of touch sensitive elements to produce the at least one distinct user input locations, the processing circuitry is operable to:
enact first touch pad configuration settings for a first grip position of the game controller; and
enact second touch pad configuration settings for a second grip position of the game controller.

7. The game controller of claim 1, wherein in the enacting the touch pad configuration settings that correlate subsets of the plurality of touch sensitive elements to produce the at least one distinct user input location, the processing circuitry is operable to:
enact first touch pad configuration settings based on the first game control input pattern, wherein a first subset of the plurality of touch sensitive elements simulating a first at least one mechanical interface function corresponding to a first gaming piece; and
enact second touch pad configuration settings based on the second game control input pattern, wherein a second subset of the plurality of touch sensitive elements simulating a second at least one mechanical interface function corresponding to a second gaming piece that differs from the first gaming piece.

8. A method for operating a game controller, the method comprising:
enacting, responsive to a user identity produced through the touch sensitive pad, touch pad configuration settings that correlate subsets of a plurality of touch sensitive elements to produce a distinct user input location configured to simulate at least one mechanical interface function;
receiving touch pad input from at least one touch sensitive pad, the touch pad input corresponding to a user's proximal touch relative to at least some of the subset of the plurality of touch sensitive elements;
processing the touch pad input to determine user input directions based upon the touch pad configuration settings;
transmitting the user input directions to a game console via the communications interface for use as gaming input; and
displaying, via a touch pad display, a simulated button corresponding to at least a portion of the at least one mechanical interface function, the simulated button corresponding to a subset of the plurality of touch sensitive elements and illuminating the simulated button.

9. The method of claim 8, wherein the enacting the touch pad configuration settings that correlate the subsets of the plurality of touch sensitive elements to produce the distinct user input locations comprises:
receiving a touch pad configuration settings message from the game console via the communications interface; and determining the touch pad configuration settings from the touch pad configuration settings message.

10. The method of claim 9, further comprising:
receiving another touch pad configuration settings message from the game console via the communications interface;
determining another touch pad configuration settings from the another touch pad configuration settings message, the another touch pad configuration settings differing from the touch pad configuration settings; and
enacting another touch pad configuration settings that correlate the subsets of the plurality of touch sensitive elements to produce another distinct user input locations.

11. The method of claim 8, wherein the enacting the touch pad configuration settings that correlate the subsets of the plurality of touch sensitive elements to produce the distinct user input locations comprises:
enacting first touch pad configuration settings for a first video game; and
enacting second touch pad configuration settings for a second video game.

12. The method of claim 8, wherein the enacting the touch pad configuration settings that correlate subsets of the plurality of touch sensitive elements to produce the distinct user input locations comprises:
enacting first touch pad configuration settings for a first portion of a video game; and
enacting second touch pad configuration settings for a second portion of the video game.

13. The method of claim 8, wherein the enacting the touch pad configuration settings that correlate the subsets of the plurality of touch sensitive elements to produce the distinct user input locations comprises:
enacting a first touch pad configuration setting for a first grip position of the game controller; and
enacting a second touch pad configuration setting for a second grip position of the game controller.

14. The method of claim 8, wherein in the enacting the touch pad configuration settings that correlate subsets of the plurality of touch sensitive elements to produce the distinct user input locations comprises:
enacting first touch pad configuration settings based on the game control input pattern, wherein a first subset of the plurality of touch sensitive elements simulating a first mechanical interface function corresponding to a first gaming piece; and
enacting second touch pad configuration settings based on the game control input pattern, wherein a second subset of the plurality of touch sensitive elements simulating a second at least one mechanical interface function corresponding to a second gaming piece that differs from the first gaming piece.

15. The method of claim 14, wherein the first and the second gaming pieces consist of:
golf club;
tennis racquet;
baseball bat;
sword;
guitar;
gun; and
knife.

16. A method for operating a game console that has a communications interface and processing circuitry coupled to the communications interface, the method comprising:
determining touch pad configuration settings for a touch pad of a game controller that includes a plurality of touch sensitive elements, the touch pad configuration settings, when enacted, based upon a user identity established via the touch pad, correlating subsets of the plurality of touch sensitive elements to produce distinct user input locations such that, based on a first game control input pattern, a subset of the plurality of touch sensitive elements simulating a mechanical interface function;
transmitting the touch pad configuration settings from the game controller via the communications interface;
receiving touch pad input from the game controller that corresponds to a user's proximal touch of at least some of the plurality of touch sensitive elements corresponding to the distinct user locations;
processing the touch pad input to produce gaming input;
applying the gaming input to a video game; and
displaying, via a touch pad display, a simulated button corresponding to at least a portion of the at least one mechanical interface function, the simulated button corresponding to a subset of the plurality of touch sensitive elements and illuminating the simulated button.

17. The method of claim 16, further comprising:
determining other touch pad configuration settings for a touch pad of a game controller that has a plurality of touch sensitive elements, the other touch pad configuration settings, when enacted, correlating subsets of the plurality of touch sensitive elements to other respective distinct user input locations;
transmitting the other touch pad configuration settings to the game controller via the communications interface;
receiving other touch pad input from the game controller that corresponds to the user's proximal touch of the at least some of the plurality of touch sensitive elements corresponding to the other distinct user locations;
processing the other touch pad input to produce other gaming input; and
applying the other gaming input.

18. The method of claim 16, wherein:
a first subset of the plurality of touch sensitive elements simulating a first mechanical interface function corresponding to a first gaming piece; and
a second subset of the plurality of touch sensitive elements simulating a second mechanical interface function corresponding to a second gaming piece that differs from the first gaming piece.

19. The method of claim 18, wherein the first and the second gaming pieces consist of:
golf club;
tennis racquet;
baseball bat;
sword;
guitar;
gun; and
knife.

20. The game controller of claim 1, wherein:
a first subset of the plurality of touch sensitive elements simulating a first mechanical interface function corresponding to a first gaming piece; and
a second subset of the plurality of touch sensitive elements simulating a second mechanical interface function corresponding to a second gaming piece that differs from the first gaming piece.

* * * * *